US012294614B2

(12) United States Patent
Voit et al.

(10) Patent No.: US 12,294,614 B2
(45) Date of Patent: May 6, 2025

(54) VERIFYING TRUST POSTURES OF HETEROGENEOUS CONFIDENTIAL COMPUTING CLUSTERS

(71) Applicant: Cisco Technology, Inc., San Jose, CA (US)

(72) Inventors: Eric Voit, Bethesda, MD (US); Pradeep Kumar Kathail, Los Altos, CA (US); Avinash Kalyanaraman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 261 days.

(21) Appl. No.: 17/583,284

(22) Filed: Jan. 25, 2022

(65) Prior Publication Data

US 2022/0321605 A1      Oct. 6, 2022

Related U.S. Application Data

(60) Provisional application No. 63/169,528, filed on Apr. 1, 2021.

(51) Int. Cl.
*H04L 9/32* (2006.01)
*G06F 21/00* (2013.01)
*H04L 9/40* (2022.01)

(52) U.S. Cl.
CPC ..................... *H04L 63/20* (2013.01)

(58) Field of Classification Search
CPC ................. H04L 63/20; H04L 63/02
(Continued)

(56) References Cited

U.S. PATENT DOCUMENTS

| 7,200,865 B1 * | 4/2007 | Roscoe | H04L 63/20 |
| | | | 726/13 |
| 7,804,791 B2 * | 9/2010 | Farkas | H04L 45/28 |
| | | | 370/216 |

(Continued)

FOREIGN PATENT DOCUMENTS

| CN | 101472276 B | * | 9/2011 | ........ H04W 12/0013 |
| CN | 102420812 A | * | 4/2012 | |

(Continued)

OTHER PUBLICATIONS

International Search Report and Written Opinion for PCT Application No. PCT/US2022/071419, mailed on Jun. 22, 2022, 12 pages.

(Continued)

*Primary Examiner* — Haresh N Patel
(74) *Attorney, Agent, or Firm* — Polsinelli P.C.

(57) ABSTRACT

Disclosed are systems, apparatuses, methods, and computer-readable media for providing security postures for a service provided by a heterogenous system. A method for verifying trust by a service node includes receiving a request for a security information of the service node from a client device, wherein the request includes information identifying a service to receive from the service node, identifying a related node to communicate with the service node based on the service, after identifying the related node, requesting a security information of the related node, generating a composite security information from the security information of the service node and the security information of the related node, and sending the composite security information to the client device. The composite security information provides security claims for a service implemented by a heterogenous devices that have different trusted execution environments.

11 Claims, 15 Drawing Sheets

(58) Field of Classification Search
USPC .......................................................... 726/3
See application file for complete search history.

(56) References Cited

U.S. PATENT DOCUMENTS

| | | | | |
|---|---|---|---|---|
| 7,920,572 | B2* | 4/2011 | Bates | H04L 67/104 |
| | | | | 370/395.5 |
| 9,425,966 | B1* | 8/2016 | Potlapally | H04L 63/0823 |
| 10,083,472 | B1* | 9/2018 | Schroder | G06Q 30/0623 |
| 10,263,861 | B2* | 4/2019 | Akiya | H04L 41/5058 |
| 10,498,634 | B2* | 12/2019 | Huang | H04L 12/6418 |
| 10,517,056 | B2* | 12/2019 | Wylie | G06Q 10/087 |
| 10,838,779 | B1* | 11/2020 | Yue | G06F 16/9024 |
| 10,958,667 | B1* | 3/2021 | Maida | H04L 63/1425 |
| 10,997,177 | B1* | 5/2021 | Howes | G06F 16/24554 |
| 11,816,662 | B2* | 11/2023 | Buradagunta | H04L 9/3297 |
| 2007/0067847 | A1 | 3/2007 | Wiemer et al. | |
| 2007/0143605 | A1 | 6/2007 | Metke et al. | |
| 2007/0143629 | A1 | 6/2007 | Hardjono et al. | |
| 2011/0078775 | A1 | 3/2011 | Yan | |
| 2014/0191875 | A1* | 7/2014 | Wedig | G08B 7/066 |
| | | | | 340/628 |
| 2014/0279808 | A1* | 9/2014 | Strassner | G06Q 10/06 |
| | | | | 706/47 |
| 2017/0230245 | A1 | 8/2017 | Jacquin et al. | |
| 2017/0324618 | A1* | 11/2017 | Lapukhov | H04L 45/18 |
| 2018/0121250 | A1* | 5/2018 | Qi | H04L 41/0896 |
| 2018/0157838 | A1 | 6/2018 | Bushey et al. | |
| 2019/0036900 | A1 | 1/2019 | Zhang et al. | |
| 2019/0182273 | A1* | 6/2019 | Walsh | H04L 63/1425 |
| 2019/0347440 | A1* | 11/2019 | Langley | H04L 9/0894 |
| 2020/0204476 | A1 | 6/2020 | Voit et al. | |
| 2020/0213302 | A1 | 7/2020 | Saha et al. | |

FOREIGN PATENT DOCUMENTS

| | | | | |
|---|---|---|---|---|
| CN | 101578841 | B | * 4/2013 | H04L 63/08 |
| CN | 104426876 | A | * 3/2015 | H04L 63/0876 |
| CN | 105848152 | A | * 8/2016 | H04W 12/06 |
| CN | 106211219 | A | * 12/2016 | |
| CN | 110225012 | A | * 9/2019 | G06F 16/23 |
| CN | 110287045 | A | * 9/2019 | |
| CN | 111915078 | A | * 11/2020 | G06Q 10/047 |
| CN | 111932380 | A | * 11/2020 | |
| CN | 111988188 | A | * 11/2020 | H04L 41/0668 |
| CN | 112417406 | A | * 2/2021 | |
| CN | 109947567 | B | * 7/2021 | |
| CN | 113645262 | A | * 11/2021 | |
| JP | 2005301550 | A | 10/2005 | |
| JP | 2012215994 | A | 11/2012 | |
| JP | 2016536713 | A | 11/2016 | |
| JP | 2018063716 | A | 4/2018 | |
| JP | 2020527298 | A | 9/2020 | |
| WO | 2009155849 | | 12/2009 | |
| WO | 2016085517 | A1 | 6/2016 | |
| WO | 2020226979 | A1 | 11/2020 | |

OTHER PUBLICATIONS

International Preliminary Report on Patentability for International Application No. PCT/US2022/071419, mailed Oct. 12, 2023, 9 Pages.

Office Action for Australian Application No. 2022246728, dated Sep. 12, 2023, 4 Pages.

Edgeless Systems, "Marblerun—The service mesh for Confidential Computing," Nov. 27, 2020, available at https://blog.edgeless.systems/why-we-need-a-service-mesh-for-confidential-computing-part-3-3-ffc00b2c3508, downloaded Nov. 14, 2021, 5 pages.

"MarbleRun," available at https://marblerun.sh/, downloaded Nov. 17, 2021, 128 pages.

"Microsoft Azure Attestation," A unified solution for remotely verifying the trustworthiness of a platform and intergrity of the binaries running inside it, available at https://azure.microsoft.com/en-us/services/azure-attestation/, downloaded Nov. 14, 2021, p. 1.

Voit, Eric, et al., "Trusted Path Routing," draft-voit-rats-trustworthy-path-routing-o4, Sep. 7, 2021, 18 pages, available at https://datatracker.ietf.org/doc/draft-voit-rats-trustworthy-path-routing/.

"Multiple Spanning Tree Protocol," Wikipedia, last edited Oct. 11, 2021, available at https://en.wikipedia.org/wiki/Multiple_Spanning_Tree_Protocol, downloaded Nov. 14, 2021, 10 pages.

Jang, Miyoung, et al., "A New Integrity Verification Method with Cluster-based Data Transformation in Cloud Computing Environment," International Journal of Smart Home, vol. 9, No. 4 (2015), pp. 225-238.

Reiter, Michael K., "A Secure Group Membership Protocol," IEEE Transactions on Software Engineering, vol. 22, No. 1, Jan. 1996, pp. 31-42.

Ricciardi, Aleta M., et al., "Using Process Groups to Implement failure Detection in Asynchronous Environments," Department of Computer Science, Cornell University, Feb. 7, 1991, 34 pages.

Christian, Flaviu, "Reaching Agreement on Processor Group Membership in Synchronous Distributed Systems," Computer Science and Engineering, University of California, San Diego, La Jolla, California, 1991, 26 pages.

Nejdl, Wolfgang, et al., "PeerTrust: Automated Trust Negotiation for Peers on the Semantic Web," L3S and University of Illinois at Urbana-Champaign, USA, 2004, pp. 118-132.

Jonker, Willem, et al., "Secure Data Management," VLDB 2004 Workshop, SDM 2004, Toronto, Canada, Aug. 2004 Proceedings, part 1 of 3, 75 pages.

Jonker, Willem, et al., "Secure Data Management," VLDB 2004 Workshop, SDM 2004, Toronto, Canada, Aug. 2004 Proceedings, part 2 or 3, 65 pages.

Jonker, Willem, et al., "Secure Data Management," VLDB 2004 Workshop, SDM 2004, Toronto, Canada, Aug. 2004 Proceedings, part 3 of 3, 91 pages.

Office Action for Japanese Application No. 2023509609, dated Apr. 22, 2024, 18 Pages.

Office Action for Korean Application No. 1020237011630, dated Aug. 15, 2024, 11 Pages.

Office Action for Japanese Application No. 2023509609, dated Nov. 1, 2024, 4 Pages.

* cited by examiner

VERIFYING TRUST POSTURES OF HETEROGENEOUS CONFIDENTIAL COMPUTING CLUSTERS

CROSS-REFERENCE TO RELATED APPLICATIONS

This application claims priority to U.S. Provisional Patent Application No. 63/169,528, filed on Apr. 1, 2021, the content of which is incorporated herein by reference in its entirety.

TECHNICAL FIELD

The present disclosure generally relates to the field of computer networking, and more particularly to assessing reliability and trustworthiness of devices operating within a network.

DESCRIPTION OF THE RELATED TECHNOLOGY

Trustworthiness of a given device operating within a network may degrade from the time of its initial configuration. Active measurements may be needed to validate that a device is equivalently trustworthy to the time of its initial deployment. New technologies are adding capabilities which support the secure, real-time reporting of active trustworthiness measurements/evaluation from a remote device. Specifically, all-in-one chips have been used to implement secure boot modules, trust anchor modules, and secure Joint Test Action Group (JTAG) solutions for verifying the trustworthiness of devices. Further, tokens or metadata elements containing security measurements or security evidence have been developed for verifying the trustworthiness of devices.

A trustworthiness vector can allow claims from a direct peer to express its verified trustworthiness. The result is that a mesh of trust can be established and maintained across a set of network devices. However, the trustworthiness vector does not express trustworthiness relationships multiple hops away, in which routing protocols were utilized to ensure that specific Internet Protocol (IP) packets only took trustworthy paths.

The problem of understanding trustworthiness across all elements of a "heterogeneous" system remains unsolved, which is not unique to networking. With the advent of Confidential Computing, it has become useful for Trusted Execution Environments (TEE) to provably assert the trustworthiness of any directly connected TEE.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
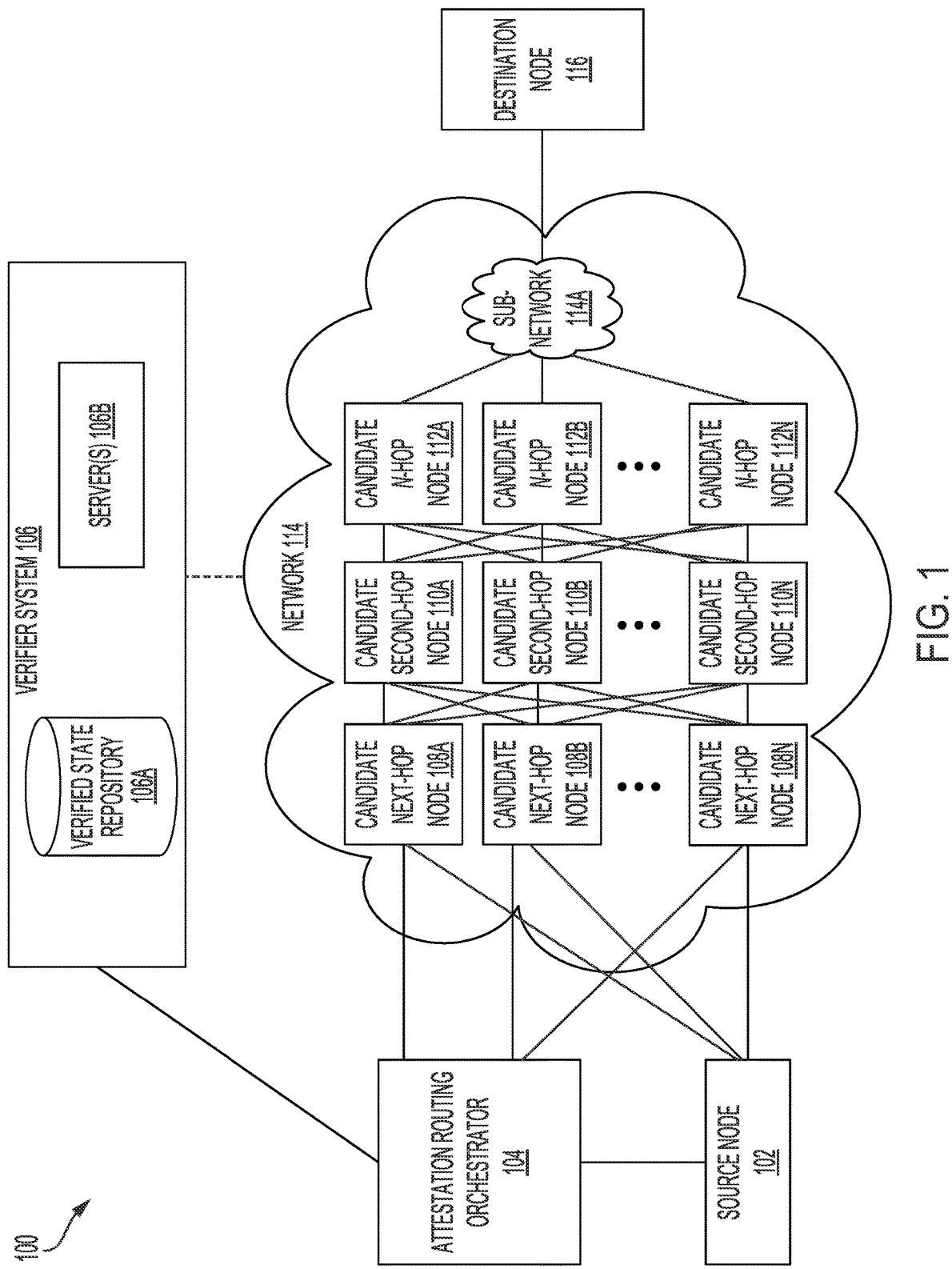
FIGS. 1 through 3 illustrate example networking environments in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and computer-readable media are provided for secure network routing. An example method can include receiving a request for a security information of the service node from a client device, wherein the request includes information identifying a service to receive from the service node; identifying a related node to communicate with the service node based on the service; after identifying the related node, requesting a security information of the related node; generating a composite security information from the security information of the service node and the security information of the related node; and sending the composite security information to the client device.

An example system can include one or more processors and at least one computer-readable storage medium storing instructions which, when executed by the one or more processors, cause the one or more processors to receive a request for a security information of the service node from a client device, wherein the request includes information identifying a service to receive from the service node; identify a related node to communicate with the service node based on the service; after identifying the related node, request a security information of the related node; generate a composite security information from the security information of the service node and the security information of the related node; and send the composite security information to the client device.

A system can include one or more processors and at least one computer-readable storage medium storing instructions which, when executed by the one or more processors, cause the one or more processors to receive a request for a security information of the service node from a client device, wherein the request includes information identifying a service to receive from the service node; identify a related node to communicate with the service node based on the service; after identifying the related node, request a security information of the related node; generate a composite security information from the security information of the service node and the security information of the related node; and send the composite security information to the client device.

In some aspects, the security information includes a plurality of claims related to a type of verification, wherein the type of verification includes at least one a hardware verification, a unique identify verification, a data integrity verification, a boot verification, and an executable verification.

In some aspects, one or more of the methods, apparatuses, and computer-readable medium described above further comprise identifying implicit claims in the security information of the related node, and appending the implicit claims to the security information from the related node.

In some aspects, one or more of the methods, apparatuses, and computer-readable medium described above further comprise combining each corresponding claim in the security information of the service node and the security information of the related node to yield the composite security information.

In some aspects, one or more of the methods, apparatuses, and computer-readable medium described above further comprise: identifying a first value associated with a first claim in the security information of the service node and a second value associated with the first claim in the security information of the related node; and generating a composite value for the first claim in the composite security information based on the first value and the second value.

In some aspects, one or more of the methods, apparatuses, and computer-readable medium described above further comprise: identifying a detracting value associated with a first claim in one of the security information of the related node and the security information of the service node; and excluding the first claim from the composite security information.

In some aspects, one or more of the methods, apparatuses, and computer-readable medium described above further comprise normalizing security claims in the security information of the related node and the security information of the service node; and combining each security claim into the composite security information.

In some aspects, one or more of the methods, apparatuses, and computer-readable medium described above further comprise executing a spanning tree algorithm to identify candidate nodes associated with the service from addressable nodes, wherein the related node is selected from the candidate nodes.

In some aspects, the service node comprises a first trusted module and the related node comprises a second trusted module, and the first trusted module is different from the second trusted module.

In some aspects, one or more of the methods, apparatuses, and computer-readable medium described above further comprise: transmitting a request to a management node to identify candidate related nodes; and receiving a list of the candidate related nodes, wherein the management node executes a group membership protocol to create different groups associated with each service.

Example Embodiments

There are different methods to verify or validate the trustworthiness of a node in a network. Attestation is one example trusted computing approach that can be used to verify the integrity of a node based on the set of transactions that have occurred since boot time. Dedicated cryptoprocessors, such as a processor in Trusted Platform Module (TPM) platform, can take measurements to attest to the trustworthiness (e.g., identity, integrity, etc.) of a node and its environment (e.g., software, hardware, operating system, running binaries, firmware, etc.). These measurements include evidence that the node is in a safe state. However, there is no current technique to understanding the trustworthiness of a heterogeneous system, which is a common feature in networking.

The disclosed technology addresses the challenges to establishing trust in a heterogenous system by identifying related service nodes associated with the service and normalizing different security claims of the related service nodes. In this manner, the attesting node can collect the various security information, create composite security information that summarizes the security claims from any related service nodes, and allow the requesting node to determine whether the attesting node is trustworthy based on the composite security information. The composite security information provides a summary of the security claims of the service.

Figure 2:
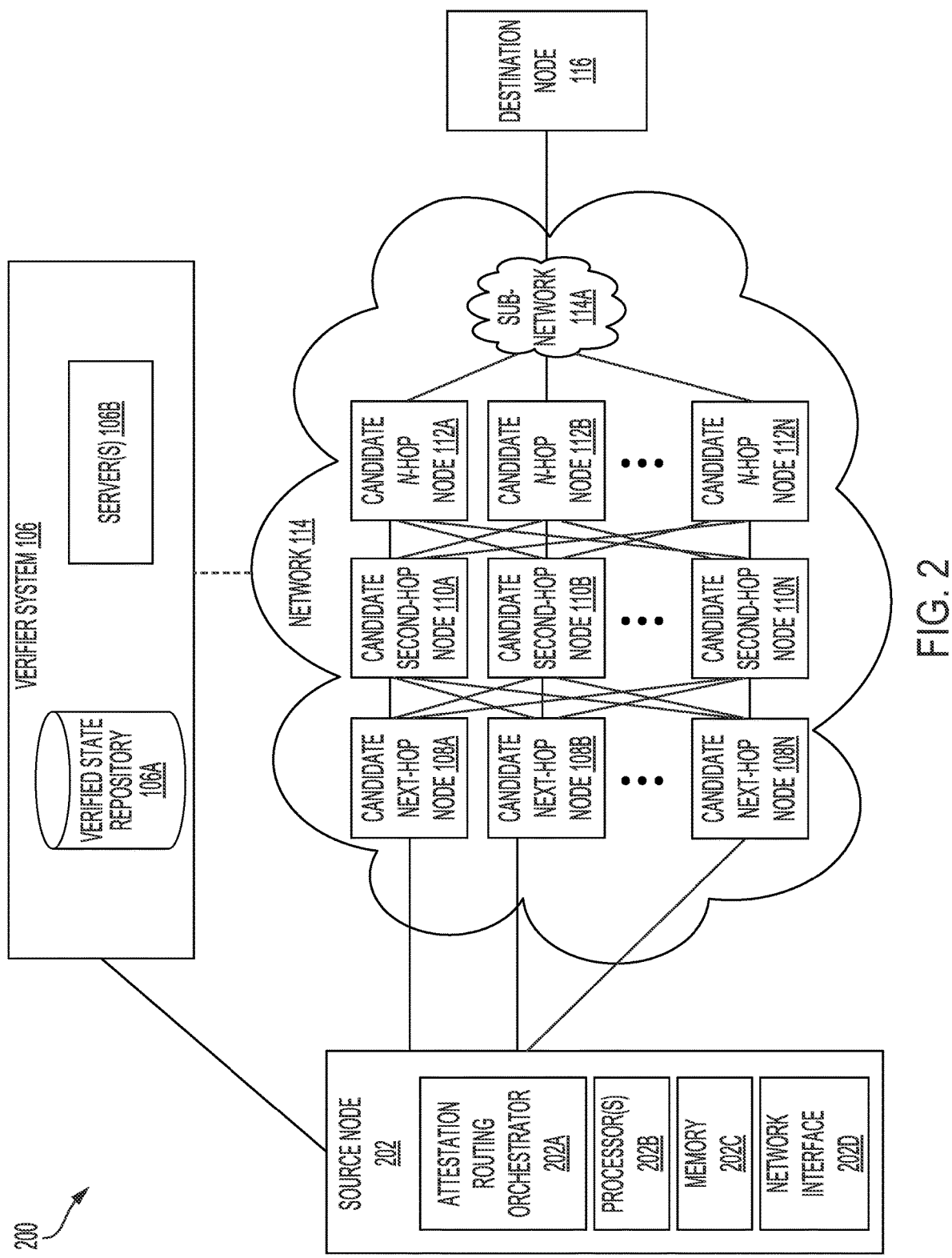
Figure 3:
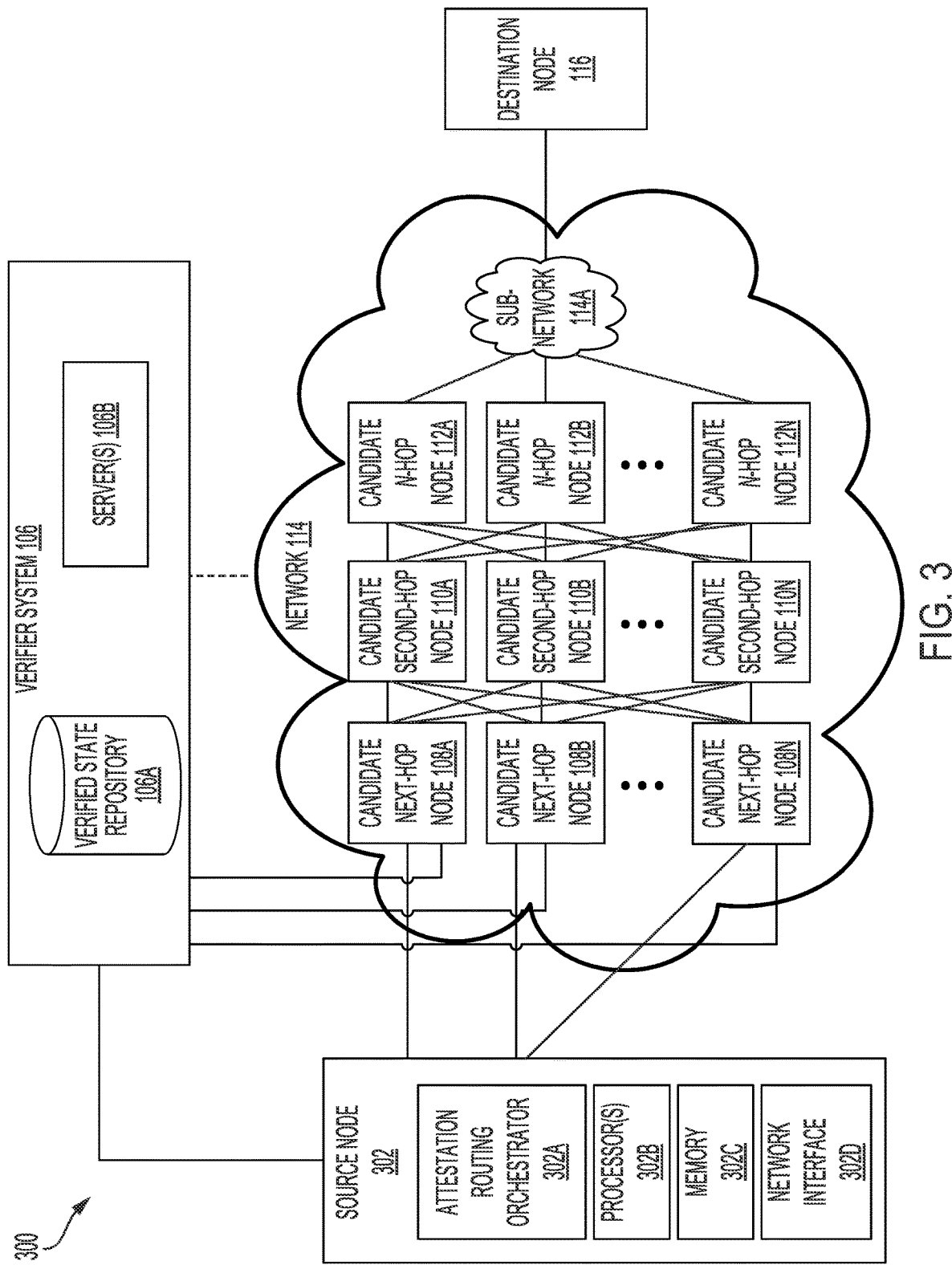
Figure 4:
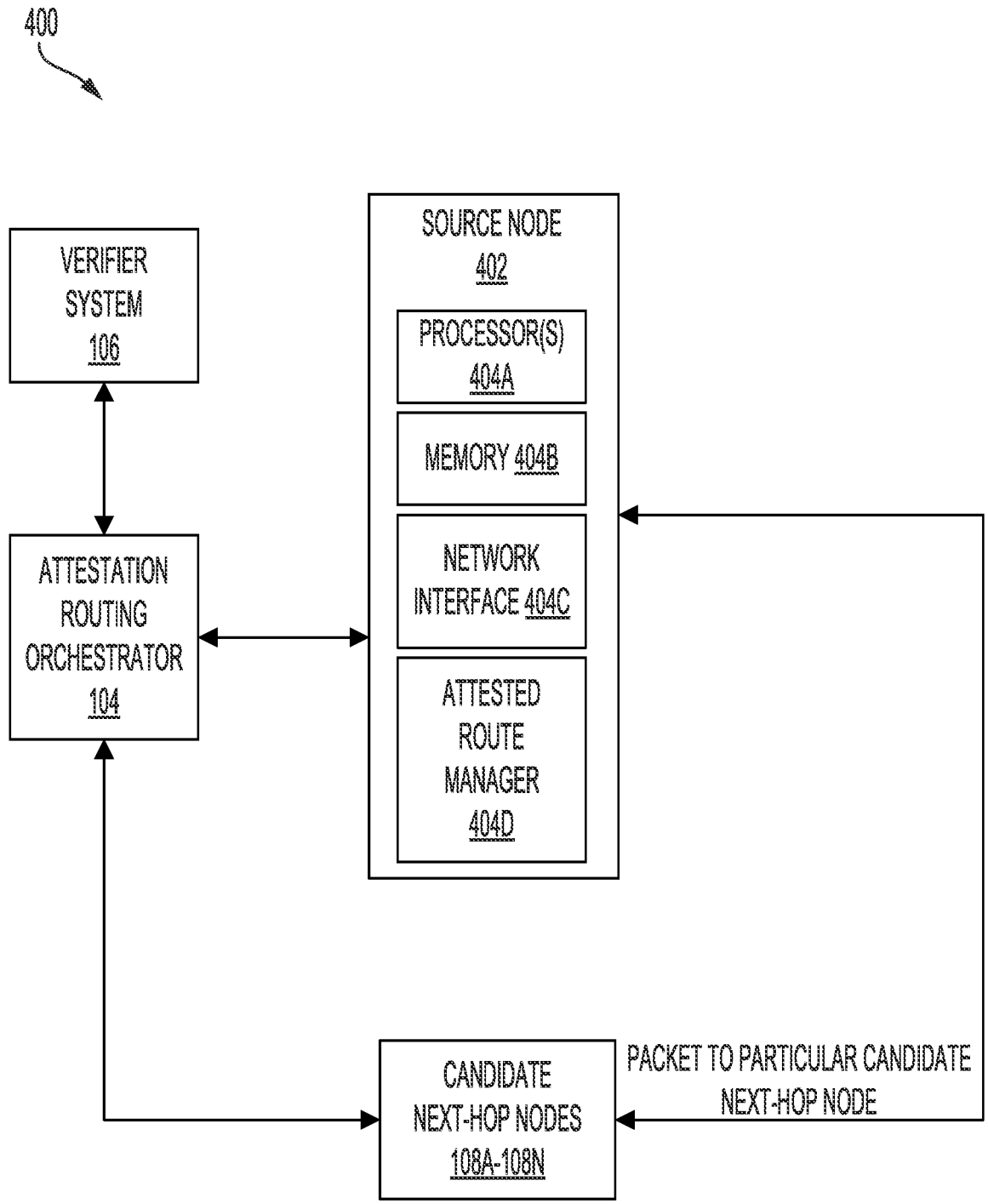
FIG. 4 illustrates an example of a controller orchestrated attestation-based routing, in accordance with some examples.

A description of network environments and architectures for network data access and services, as illustrated in FIGS. 1, 2, and 3 is first disclosed herein. An attestation routing orchestrator illustrated in FIG. 4 is then described. The disclosure then turns to an example system that generates a composite security claim in a heterogenous network and a corresponding sequence diagram in FIGS. 5 and 6. Various examples of generating composite security information are then discussed in connection with illustrations in FIGS. 7, 8, 9, and 10. A method of generating a composite security claim in a heterogenous network is then discussed with reference to FIGS. 11, 12, and 13. The discussion then concludes with a brief description of example devices, as illustrated in FIG. 14. These variations shall be described herein as the various embodiments are set forth. The disclosure now turns to an initial discussion of example concepts and technologies for providing verifiable proof of the integrity of network nodes traversed by packets.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities, and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as random access memory (RAM), read only memory (ROM) and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices and maintain these logs in trusted storage. These logs can be protected by embedding a private key into every trust anchor produced for a hardware device and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence, can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata element associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a packet. In some cases, the metadata elements and tokens can be carried within an In-Situ (or in-band) Operations, Administration and Management (IOAM) data field. In some implementations, the metadata elements and tokens can be carried with IOAM trace data. For example, a canary stamp can be carried as part of an IOAM data field in a variety of encapsulation protocols such as, for example and without limitation, IPv4, IPv6, network service header (NSH), etc. In some cases, the canary stamp can be carried in an IOAM data field as an IOAM Trace option data element (e.g., with an IOAM Trace type for node integrity canary stamp). A metadata element, token, or digest, e.g. canary stamp digest, can be added in the IOAM trace option of a packet by each node that forwards the packet.

When the packet reaches a node (e.g., the destination node and/or an intermediate node) that removes IOAM metadata (e.g., an IOAM decapsulating node), the validity of the metadata element and/or token in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the metadata elements or tokens. This is because the measurement values can often change infrequently. The verifier may only need to validate a metadata element and/or token carried within an IOAM data trace whenever the associated security measurements associated change (e.g., a verifier may only need to check with a controller whenever it sees a node's TPM extends a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

In another example, a packet can carry IOAM POT data with space optimization of metadata element values, e.g. canary stamp values. For example, a new IOAM POT data field can carry a canary stamp or a hash extend of a canary stamp and, in turn, canary stamp data can be carried across nodes. In some cases, a canary stamp hash extend can be a similar method as PCR extend operation performed by TPMs.

In some cases, the canary stamp hash can provide a one-way hash so that a canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the packet can forward the packet with a new or updated canary stamp digest. In some examples, the new or updated canary stamp digest can be generated by a node as follows: IOAM canary stamp digest new value=Digest of (IOAM canary stamp digest old value||hash (canary stamp of the node)), where the IOAM canary stamp digest old value can refer to the canary stamp digest included in the packet by one or more previous hops.

Moreover, in some cases, a Per Packet Nonce (PPN), where PPN changes per packet and is carried as another field within the IOAM metadata option, can be added to provide robustness against replay attacks. To illustrate, in some examples, a PPN can be added as follows: IOAM canary stamp digest new value=Digest of (IOAM canary stamp digest old value||hash (canary stamp of the node||PPN)). A node creating the new value for the IOAM canary stamp digest can thus take the value of any previous IOAM canary stamp digest and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the packet was forwarded. A verifier can be an inline device or a centralized device. Moreover, in some examples, nodes that are expected to be traversed can be identified using IOAM tracing, routing state or by sending active probes. A match between the value of POT data carrying specific metadata elements, e.g. a canary stamp digest and the expected canary stamp value, can prove that the packet traversed through trusted or uncompromised nodes.

In some examples, one or more strategies can be implemented to optimize metadata element validation. For example, metadata elements, e.g. canary stamps, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a Time-Based Uni-Directional Attestation (TUDA) scheme such as the TUDA scheme described in https://tools.ietf.org/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value||hash (canary stamp of the node||TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attestor, e.g. a node or a verifier, can use random numbers, otherwise pseudo-random numbers, created by peers and/or the attestor to generate and verify attestation information. Specifically, the attestor can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attestor, can use the result created by the cryptoprocessor, to verify/validate that their corresponding provided random number was used in generating the nonce ultimately used by the cryptoprocessor to create the result. In turn, the layer 2 peers, potentially including the attestor, can generate verified attestation information based on the random numbers generated by the peers, the nonce created from the random numbers, and/or the result created by the cryptoprocessor from the nonce.

Having provided an initial discussion of example concepts and technologies for providing explicit verifiable proof of integrity of network nodes traversed by packets, the disclosure now turns to FIG. 1.

FIG. 1 is a block diagram of an example of networking environment 100 in accordance with some implementations. While pertinent features are shown, those of ordinary skill in the art will appreciate from the present disclosure that various other features have not been illustrated for the sake of brevity and so as not to obscure aspects of the example implementations disclosed herein.

In this example, the networking environment 100 can include a network 114 of interconnected nodes (e.g., 108A-N, 110A-N, and 112A-N). The network 114 can include a private network, such as a LAN, and/or a public network, such as a cloud network, a core network, and the like. In some implementations, the network 114 can also include one or more sub-networks, such as sub-network 114A. Sub-network 114A can include, for example and without limitation, a LAN, a virtual local area network (VLAN), a datacenter, a cloud network, a WAN, etc. In some examples, the sub-network 114A can include a WAN, such as the Internet. In other examples, the sub-network 114A can include a combination of nodes included within a LAN, VLAN, and/or WAN.

The networking environment 100 can include a source node 102. The source node 102 can be a networking device (e.g., switch, router, gateway, endpoint, etc.) associated with a data packet that is destined for a destination node 116. The source node 102 can communicate with candidate next-hop nodes 108A-108N on the network 114. Each of the candidate next-hop nodes 108A-108N can be included within a respective route between the source node 102 and the destination node 116. Moreover, in some cases, each of the candidate next-hop nodes 108A-108N can communicate with candidate second hop nodes 110A-110N in the network 114. Each of the candidate second hop nodes 110A-110N can similarly communicate with candidate N-hop nodes 112A-112N in the network 114.

The networking environment 100 can also include an attestation routing orchestrator 104. The attestation routing orchestrator 104 can communicate with the candidate next-hop nodes 108A-108N. In some implementations, the attestation routing orchestrator 104 can obtain attestation data (e.g., canary stamps, security measures, signatures, and/or metadata) or vectors from the candidate next-hop nodes 108A-108N. In some examples, the attestation routing orchestrator 104 can obtain additional information from candidate second-hop nodes 110A-110N and/or candidate N-hop nodes 112A-112N and utilize the additional information in selecting a particular candidate next-hop node for a packet. In some implementations, the attestation routing orchestrator 104 can also obtain additional information from nodes that are more than two hops away (e.g., candidate third hop nodes, candidate fourth hop nodes, etc.).

The attestation routing orchestrator 104 can communicate with a verifier system 106. While, the verifier system 106 is conceptually shown as being implemented separate from the network 114, the verifier system 106 can be implemented within the network 114, e.g. as part of a network device in the network 114. In some implementations, the attestation routing orchestrator 104 can obtain trusted state, such as a trusted image vector, from the verifier system 106. The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.).

As will be described in great detail with reference to FIG. 4, in some cases, the attestation routing orchestrator 104 can select and direct a data packet to a particular candidate next-hop node of the candidate next-hop nodes 108A-108N based on a trusted state or image vector and the attestation states or vectors. Moreover, the attestation routing orchestrator 104 can direct the data packet destined for the destination node 116 to the particular candidate next-hop node.

FIG. 2 is a block diagram of another example networking environment 200 in accordance with some implementations. In this example, the networking environment 200 includes a source node 202 that implements an attestation routing orchestrator 202A. In some implementations, the attestation routing orchestrator 202A can be similar to, or adapted from, the attestation routing orchestrator 104 in FIG. 1.

The source node 202 can include one or more processors 202B. In some implementations, the one or more processors 202B can provide processing resources for generating a confidence scores for the candidate next-hop nodes 108A-108N. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the candidate next-hop nodes 108A-108N and optionally attestation states or vectors obtained from the candidate second hop nodes 110A-110N and/or the candidate N-hop nodes 112A-112N. The source node 202 can also include a network interface 202D for obtaining, receiving, and transmitting the data packets and states or vectors.

In some implementations, the source node 202 can select and direct a data packet to a particular candidate next-hop node based a trusted state or image vector and the attestation states or vectors.

FIG. 3 is a block diagram of another example networking environment 300 in accordance with some implementations. In this example, one or more of the candidate next-hop nodes 108A-108N can relay a trusted state or image vector from the verifier system 106 to the source node 302. In some implementations, a source node 302 can includes the attestation routing orchestrator 302A similar to, or adapted from, the attestation routing orchestrator 104 in FIG. 1 and/or the attestation routing orchestrator 202A in FIG. 2. The source node may include a processor 302B, a memory 302C, and a network interface 302D.

In some implementations, the verifier system 106 can sign the trusted state or image vector and provide the signed trusted state or image vector to a particular candidate next hop node, which in turn can provide the signed trusted state or image vector to the source node 302. In some implementations, having the particular candidate next hop node provide the signed trusted state or image vector can reduce attestation time (e.g., the time to determine trustworthiness of the particular candidate next hop node) because the source node 302 may not need to contact a remote node (verifier system 106). In some implementations, attestation time can be further reduced because a single attestation process (e.g., the verifier system 106 signing the trusted state or image vector) facilitates the attesting of multiple source nodes. In other words, trusted states or image vectors may not be generated and evaluated on a per source node basis.

Moreover, in implementations in which the source node 302 is not connected to the verifier system 106 (e.g., link down), obtaining the trusted state or image vector from the particular candidate next hop provides an alternative mechanism for node attestation. In some implementations, the verifier system 106 appends a time-stamped response to the trusted state or image vector as part of the signing process, which can be referred to as stapling. Consequently, the source node 302 may not contact the verifier system 106 in order to attest a particular candidate next hop node.

FIG. 4 is a block diagram of an example controller-orchestrated attestation-based routing 400, in accordance with some implementations. In some examples, the source node 402 is similar to, or adapted from, the source node 102 in FIG. 1. As illustrated in FIG. 4, the attestation routing orchestrator 104 is separate from, but coupled (e.g., connected) to, the source node 402. In some examples, the attestation routing orchestrator 104 can include a controller with knowledge of the network 114 that includes the candidate next-hop nodes 108A-N and optionally the candidate second-hop nodes 110A-N and/or the candidate N-hop nodes 112A-N.

For example, in some implementations, the attestation routing orchestrator 104 can be a network management system (NMS). As another example, in some implementations, the attestation routing orchestrator 104 can be an intent-based networking system, such as Cisco's Digital Network Architecture (DNA). As yet another example, in some implementations, the attestation routing orchestrator 104 can be a wireless LAN controller (WLC), and the candidate next-hop nodes 108A-108N and optionally the candidate second hop nodes 110A-N and/or the candidate N-hop nodes 112A-N can be networking devices such as access points, user devices, switches, routers, firewalls, etc.

The attestation routing orchestrator 104 can obtain attestation data (e.g., canary stamps) from the candidate next-hop nodes 108A-108N. Each of the candidate next-hop nodes 108A-108N can be included within a respective route between the source node 402 and a destination node (e.g., 114). In some implementations, the respective routes are independent of each other.

The attestation routing orchestrator 104 can determine confidence scores based on the attestation data. For example, in some cases, each of the confidence scores can be based on a comparison between a corresponding one of the attestation data and a trusted state or image vector. In some implementations, the attestation routing orchestrator 104 can obtain the trusted state or image vector from the verifier system 106.

In some examples, the attestation routing orchestrator 104 can obtain attestation data from candidate second-hop nodes (e.g., 110A-N) and/or candidate N-hop nodes (112A-N). Each of the candidate second-hop nodes and/or the candidate N-hop nodes can be included within a respective route between a corresponding one of the candidate next-hop nodes 108A-108N and the destination node. Moreover, each of the confidence scores can additionally be based on a comparison between a corresponding one of the attention data and the trusted state or image vector in combination with a comparison between another corresponding one of the attestation data from the candidate next-hop nodes 108A-N and the trusted state or image vector.

The attestation routing orchestrator 104 can select, from the confidence scores, a particular confidence score that satisfies one or more selection criteria. The particular confidence score is associated with a particular candidate next-hop node of the candidate next-hop nodes 108A-108N.

The attestation routing orchestrator 104 can directs, to the particular candidate next-hop node, a data packet destined for the destination node. For example, in some cases, the attestation routing orchestrator 104 can provide attested route information (e.g., validated canary stamp data, security measurements, etc.) to an attested route manager 404D of the source node 402 in order to facilitate the source node 402 sending the data packet to the particular candidate next-hop node. The attested route information can be indicative of the trustworthiness of each of the candidate next-hop nodes 108A-108N.

For example, in some implementations, the attested route information includes an identifier (e.g., an internet protocol (IP) address, a media access control (MAC) address, a service set identifier (SSID), etc.) identifying a secure candidate next-hop node of the candidate next-hop nodes 108A-108N. In this example, the source node 402 can provide the data packet based on the identifier in order to route the data packet to the secure, particular candidate next-hop node.

As another example, in some implementations, the attested route information can include confidence scores associated with the candidate next-hop nodes 108A-108N. In this example, the attested route manager 404D can select a particular candidate score based on one or more selection criteria. Moreover, the attested route manager 404D can provide the data packet to the particular next-hop node associated with the particular candidate score. In some examples, the attestation routing orchestrator 104 can cease to direct additional data packets to the particular candidate next-hop node in response to determining that the particular confidence score falls below a confidence threshold.

In some cases, the source node 402 can include one or more processors 404A. The one or more processors 404A can provide processing resources for managing attested route information obtained from the attestation routing orchestrator 104. The source node 402 can also include a memory 404B. The memory 404B can include, for example, a non-transitory memory such as RAM, ROM, etc. In some examples, the memory 404B can store data such as the obtained attested route information and data packets to be transmitted. The source node 402 can also include a network interface 404C for obtaining the attested route information and sending/receiving other data.

In some cases, whether a network device has been compromised can be determined based on indicators associated with the network device and time information. The indicators can include, but are not limited to, a set of security measurements or evidence footprints which indicate whether a particular device is compromised. Such indicators can come from one or more sources such as, for example and without limitation, TPM, canary stamps, Syslog, YANG Push, EEM, peer devices, traffic counters, and other sources. Visibility can be a method of identifying a compromise in a timely manner.

When there are no indicators (i.e., no security measurements or footprints available), the probability of a device being compromised can be a function of the time which has passed since a last validation that the device is in a known good state. In some cases, with the foregoing indicators, a formula can be provided for estimating probability or chance of a compromise on any given device operating within a network.

For example, $P\_v1$ can be defined as a probability for compromise of type 1 when there is a specific set of events/signatures existing which correspond to the compromise. $P\_v2$ can be defined as probability for compromise of type 2 and $P\_vx$ can be defined as probability for compromise of type x. Assuming each of these compromises ($P\_v1$ through $P\_vx$) are independent, the following equation can provide the probability of a compromise based on recognized signatures ($P\_v$):

$$P\_v = 1 - ((1-P\_v1)(1-P\_v2)(1-P\_vx)) \qquad \text{Equation (1)}.$$

Other type of equations can be used instead of, or in conjunction with, equation (1) when there are interdependencies between different types of evaluated compromises ($P\_v1$, $P\_v2$, $P\_vx$).

Furthermore, in some cases, a given probability (e.g., $P\_v1$-$P\_vx$) can be determined based on evidence of events from a device for which the probability of a compromise is being calculated (e.g., via equation (1)) and/or evidence obtained from one or more devices adjacent to the device for which the probability of a compromise is being calculated (e.g., via equation (1)).

In some cases, a probability that an invisible compromise has occurred at a device in the deployment environment can be expressed by the equation:

$$P_i = (1-xt)^n \qquad \text{Equation (2)}.$$

In equation 2, x is the chance of an invisible comprise chance in time period t, and n is the number of t intervals since a last verification of a good/uncompromised system state.

Effectively knowing $P_i$ can imply that an operator knows the half-life which should be expected before a device should be considered compromised independently of any concrete evidence. It should be noted that a probability of an invisible compromise does not have to be static. Real-time modification based on current knowledge of viruses/attacks may be allowed.

With formulates for visible and invisible factors as described above (equation (1) and equation (2)), an overall probability of a compromise for a given device may be given by:

$$P_c = 1-((1-P_v)*(1-P_i)) \qquad \text{Equation (3)}.$$

Equation (3) provides an indicator of trustworthiness of a given device. This metric considers both time-based entropy and any available evidence which can be correlated to known compromises.

If $P_c$ can be calculated (or roughly estimated), various functions can be efficiently prioritized. For example, a controller may schedule when to do deeper validation (or perhaps direct refresh) of a device. This scheduling could include determining when to perform active checks to validate device memory locations (locations possibly containing executable code which might have been compromised). These can be used to return the system to a known good state (and reset the entropy timer). Local configuration repositories can be refreshed based on evidence of security/trustworthiness issues underway, rather than being based just on time. Beyond the scheduling of system checks, there can be forwarding implications based on the value of $P_c$. For example, routing or switching behavior might be adjusted/impacted based on the relative trustworthiness of a remote device. Where a higher $P_c$ values exist, sensitive data traffic flows can be routed around that device.

As a further advantage of the present disclosure, it should be noted that encryption alone may be insufficient to protect sensitive flows since there are scenarios where even the fact that a flow is occurring between endpoints might be considered information to be protected (e.g., in a battlefield).

As discussed previously, a trustworthiness vector can allow claims from a direct peer to express its verified trustworthiness. A trustworthiness vector includes at least one security claim that attests to security of a particular parameter such as boot integrity, hardware integrity, or executable integrity. The security claims can be affirming to support security or detracting (or denying) to support security. The result is that a mesh of trust can be established and maintained across a set of network devices. However, the trustworthiness vector does not express trustworthiness relationships multiple hops away, in which routing protocols were utilized to ensure that specific IP packets only took trustworthy paths.

With the advent of Confidential Computing, it has become useful for TEE to provably assert the trustworthiness of any directly connected TEE. Systems can be configured to directly peer with known and provably genuine/trustworthy instances of software. However, knowledge of the status of directly connected peers does not prove the trustworthiness of the entire underlying system because untrustworthy data may have been inserted upstream. A single claim of trust at an endpoint is therefore not sufficient to establish a level of trust of all components that are included in a heterogenous system, and there is no current method to share trustworthiness of a heterogenous system.

The present includes systems, methods, and computer-readable media for solving these problems/discrepancies. Specifically, the present technology involves system, methods, and computer-readable media for verifying the trustworthiness of any indirectly connected TEE, which provides data to the directly connected TEE.

By standardizing claims of trustworthiness that can be asserted between heterogeneous systems, it is possible for a heterogeneous set of applications and compute devices to maintain a system-wide trustworthiness vector (e.g., a trustworthiness posture). The system-wide trustworthiness vector can be an intersection of affirming claims and the union of detracting claims. In other examples, the system-wide trustworthiness posture can be mathematical and logical combination of claims associated with service nodes in the heterogeneous system. The system-level trustworthiness vector can also be used by any device connecting into the heterogeneous system to determine whether to allow connectivity with the peer system and whether to apply policies on the connection to the peer system (e.g., rate limits, connect to a specific context, etc.).

Table 1 illustrates examples of various security claims that can be included in the trustworthiness vector, in accordance with some examples. In some examples, a system can normalize (e.g., standardize) claims of trustworthiness that can be asserted by an application verifier relating to the attesting device. Security claims can affirm the security of a device or detract (e.g., deny) the security of a device.

TABLE 1

| Category | Parameter | Description | Security Claim Type |
|---|---|---|---|
| Hardware Integrity | hw-authentic | Attester has only authentic hardware (and firmware, if tracked) | Affirm |
| Hardware Integrity | hw-verification-fail | Attester has failed one or more hardware or firmware verifications | Detract |
| Unique ID | identity-verified | Attester has a verified unique identity | Affirm |
| Unique ID | identity-fail | Cannot verify Attester's unique identity | Detract |
| Boot Integrity | boot-verified | Attester is boot integrity verified | Affirm |
| Boot Integrity | boot-verification-fail | Attester has failed its boot integrity verification | Detract |
| | file-repudiated | File(s) exist which should not be present in Attester | Detract |
| Executables Integrity | executables-verified | All executable installed into memory are from known good sources | Affirm |
| Executables Integrity | executables-fail | An executable from an unknown source is installed | Detract |
| | confidential-data-in-motion | Attester memory is opaque to OS and Hypervisor | Affirm |
| | confidential-data-at-rest | Attester persistent storage protected via hardware-based keys | Affirm |
| | source-data-integrity | Any data retrieved from outside the Attester can be associated with a trustworthiness vector with no less than the current vector | Affirm |

In some examples, the security claims can be a list of the claims, and the existence of multiple claims could indicate a race condition (e.g., ["executables-verified," "executables-fail"] is logically impossible. In other examples, the security claims could be key-value pairs that identify the security claim, which may correspond to security claims in Table 1, and a corresponding value. For an example object corresponding to the JavaScript object notation (JSON) of [{"areExecutablesVerified": true, "fileIntegrity": "225"}]), the "areExecutablesVerified" corresponds to the "executables-verified" and "executables-fail" security claims and includes an integer value that identifies a security value associated with a security claim associated with file system integrity.

Different trusted computing devices (e.g., different TEEs) have different security parameters, security requirements, and so forth. Examples of TEEs include, for example, TPM, Cisco trust anchor module (TAM), ARM TrustZone, AMD platform security processor (PSP), Secure Service Container (SSC), Secure Execution, Intel Software Guard Extensions (SGX) secure enclave, MultiZone, Keystone Enclave, Microsoft Pluton, and Penglai Enclave. Different trusted computing devices can have different security claims and the disclosed system and method can normalize device claims against the capabilities of different TEE types. For example, the system can identify which claims are automatic or implicit to a particular type of TEE. Some implicit claims can include that "confidential-data-in-motion" is valid when a workload is verifiably running within a secure enclave (e.g., Intel SGX Secure Enclave). Table 2 below illustrates a comparison of security claims from a TPM device and a TAM device and how the corresponding security claim can be determined.

TABLE 2

| Security Claim | TPM | TAM |
| --- | --- | --- |
| hw-authentic | If PCRs + Logs Check | Implicit in signature from Attester + Verifier |
| hw-verification-fail | If PCRs + Logs fail check | Implicit if signature not OK |
| identity-verified | If a unique Attesting Environment ID is verified for this device | SGX hardware ID must be sent for this to be checked |
| identity-fail | If a unique Attesting Environment ID is not verified for this device | SGX hardware ID must be sent for this to be checked |
| boot-verified | If PCRs + Logs Check | Implicit in signature from Attester + Verifier |
| boot-verification-fail | If PCRs + Logs fail check | Implicit if signature not OK |
| file-repudiated | If Verifier finds an issue with filesystem | A co-resident Verifier found an issue with the filesystem |
| executables-fail | If PCRs + Logs fail check | A co-resident Verifier found an issue with code loaded after boot |
| confidential-data-in-motion | TPM only, TEE insufficient to set this parameter | Implicit in signature from Attester + Verifier |
| confidential-data-at-rest | TPM only, TEE insufficient to set this parameter | Implicit if signature not OK |
| source-data-integrity | TPM only, TEE insufficient to set this parameter | Optional |

Tables 3 and 4 illustrate examples of trustworthiness vectors, in accordance with some examples. The trustworthiness vectors in Tables 3 and 4 are illustrated in JSON format for illustrative purposes and can be provided in any suitable format. In some implementations, the system can include a verifier process that is related to the attester generating a trustworthiness vector, which can sum the set of claims relating to the attester device with other microservices/sub-systems that exchange application data with the attester. The trustworthiness vector can be exposed outside of the set of attesters on an interface. This can enable other processes, outside of the set of attesters, to determine whether the attester interface can assert that it can support a set of business relevant/useful security claims. For example, the system can express whether the set of devices on a far side of the interface are able to meet a minimal trustworthiness level.

TABLE 3

Boolean-based Trustworthiness Claim

```
{
  "claims":
  [
    "hw-authentic",
    "identify-verified",
    "confidential-data-at-test",
    "confidential-data-in-motion",
    "file-repudiated"
  ]
}
```

TABLE 4

Integer-based Trustworthiness Claim

```
{
  "claims":
  [
    { "hw-authentic": 255 },
    { "identify-verified": 127 },
    { "confidential-data-at-test": 191 },
    { "confidential-data-in-motion": 128 },
    { "file-repudiated": 32 },
  ]
}
```

Figure 5:
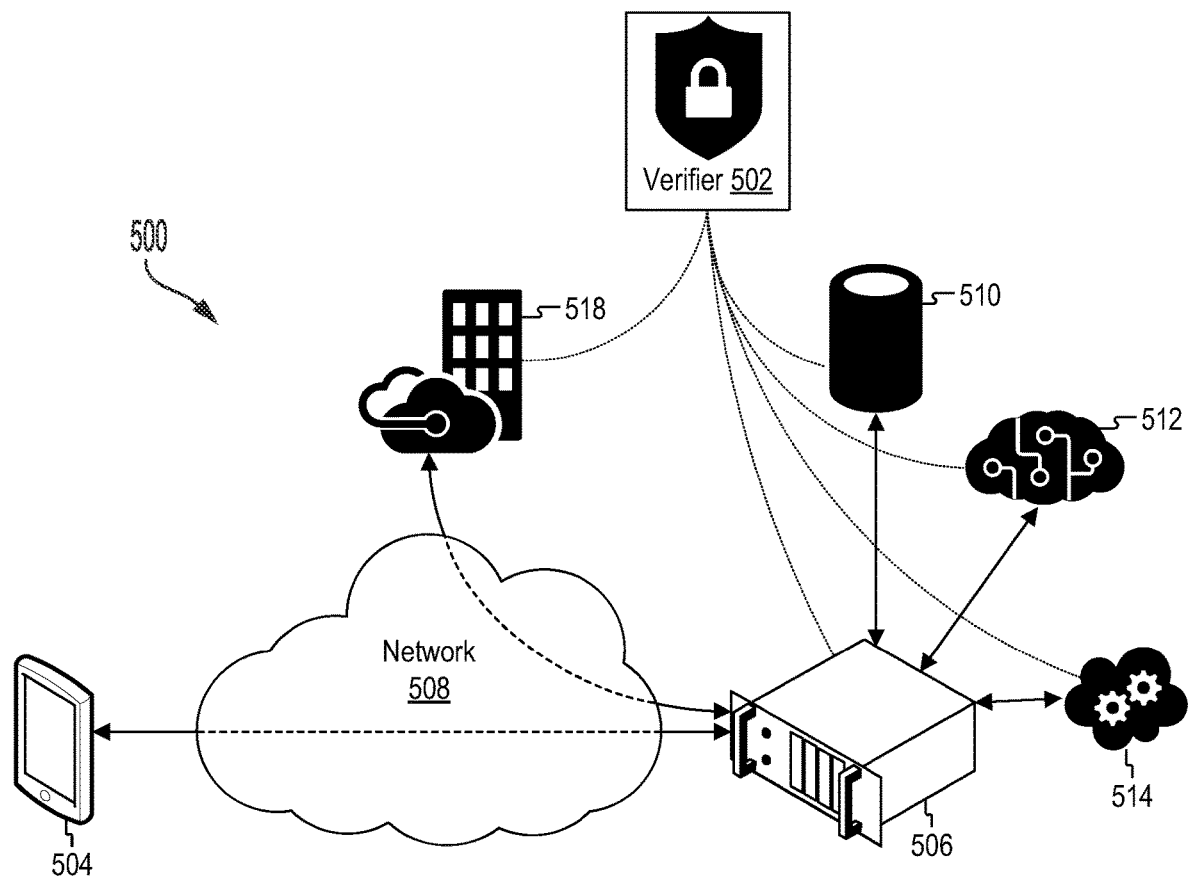
FIG. 5 illustrates an example of a hub-and-spoke topology 500 for interconnecting attesters, in accordance with some examples.

FIG. 5 illustrates an example of a hub-and-spoke topology 500 for interconnecting attesters, in accordance with some examples. In some implementations, the trustworthiness vector (e.g., a security information) can be generated by the system by utilizing a base claim or a dependent claim. The method of generating the trustworthiness vector can be based on the topology of interconnecting systems. For example, the method of generating the trustworthiness vector can include the least computational effort and optimal operational simplicity. Three methods of calculating system-level claims are described herein and can be based on a topology of interconnecting attesters.

In some implementations, a hub-and-spoke topology of interconnecting attesters can be utilized. For example, a verifier 502 can assess the trustworthiness of each attester and generate a device-specific trustworthiness vector (e.g., security information). For example, the verifier 502 can generate a trustworthiness vector for a storage medium 510, an artificial intelligence (AI) service 512, a cloud service 514, or a public cloud infrastructure 518. A client 504 may request a trustworthiness vector from a server 506 for a service based on a request transmitted through a network 508. In some cases, the service can be a transient request (e.g., a lookup of a bank account) or a persistent connection (e.g., a streaming media connection). Non-limiting examples of a persistent connection can be formed with, for example, a Google remote procedure call (gRPC) connection, a websocket connection, etc.

The server 506 can generate security information (e.g., a trustworthiness vector) based on a hub-and-spoke topology based on interconnected devices that are associated with the service. For every service node of the attester (e.g., server 506), where data requiring trustworthy treatment is provided or received, server 506 can retrieve an upstream trustworthiness vector from related service nodes using a mechanism to ensure that the trustworthiness vector cannot be tampered with. In the example illustrated in FIG. 5, the server 506 determines that a storage medium 510 (e.g., a relational database, a document database, a graph query language (GraphQL) service, etc.), an AI service 512, and cloud service 514 may be integral to the service by the server 506. The server 506 may also identify that a public cloud infrastructure 518 may be directly or indirectly implemented into the service for client 504.

In some implementations, the server 506 can use different mechanisms to identify related service nodes. For example, server 506 can use a group membership protocol to request a management node that manages members of a group to identify related service nodes at run time. In other examples, server 506 and service nodes can implement a spanning-tree protocol to prevent the formation of circular loops of related service nodes. In one example, the server can provide a service and each connection request can be analyzed at compile time. For example, during the parsing stage of a compiler, each end point associated with a connection request can be identified and the parser may be configured to insert a code to request the security information based on the endpoints of each corresponding connection request.

The server 506 can also ensure that the trustworthiness vector cannot be tampered with, which can vary by TEE type. For example, in SGX, interfacing with a developer-signed Secure Enclave can be sufficient. In the example of a service node of the server 506 (e.g., storage medium 510, AI service 512, cloud service 514, or public cloud infrastructure 518) that includes a TPM, a stamped passport can be required from that service node.

In some examples, the server 506 may convert any implicit claims associated with a TEE into corresponding explicit claims. The server 506 can be configured to normalize implicit and explicit claims from the combination of the various service nodes. Based on the normalized security claims, the server 506 can synthesize a composite trustworthiness vector (e.g., composite security information) that provides standardized security information for a group of heterogenous service nodes. For example, a particular TEE type can include a single parameter that could correspond to two different, normalized parameters, and the server 506 would convert the single parameters into the two normalized parameters. If a parameter of the trustworthiness vector is unavailable from an interface, or it cannot be verified, the trustworthiness vector can be deemed null or set to a default value.

The server 506 synthesizes a composite trustworthiness vector (e.g., a trustworthiness vector) based on the explicit and implicit claims based on affirming or detracting values from the trustworthiness vector of the server 506 and the trustworthiness vector from the service nodes. In one example, security claims can be logically combined to generate the composite trustworthiness vector that summarizes affirming and detracting claims. For example, for any affirming claims, the composite trustworthiness vector can be generated based on the intersection (e.g., a logical AND) of device trustworthiness vector and each upstream system trustworthiness vector, and, for any detracting claims, the composite trustworthiness vector can be generated based on the union (e.g., a logical OR) of device trustworthiness vector and each upstream system trustworthiness vector. In some examples, the affirming claims and detracting claims can be integers that represent a plurality of values (e.g., 0-255) and each claim can be combined based on a mathematical operation.

Figure 6:
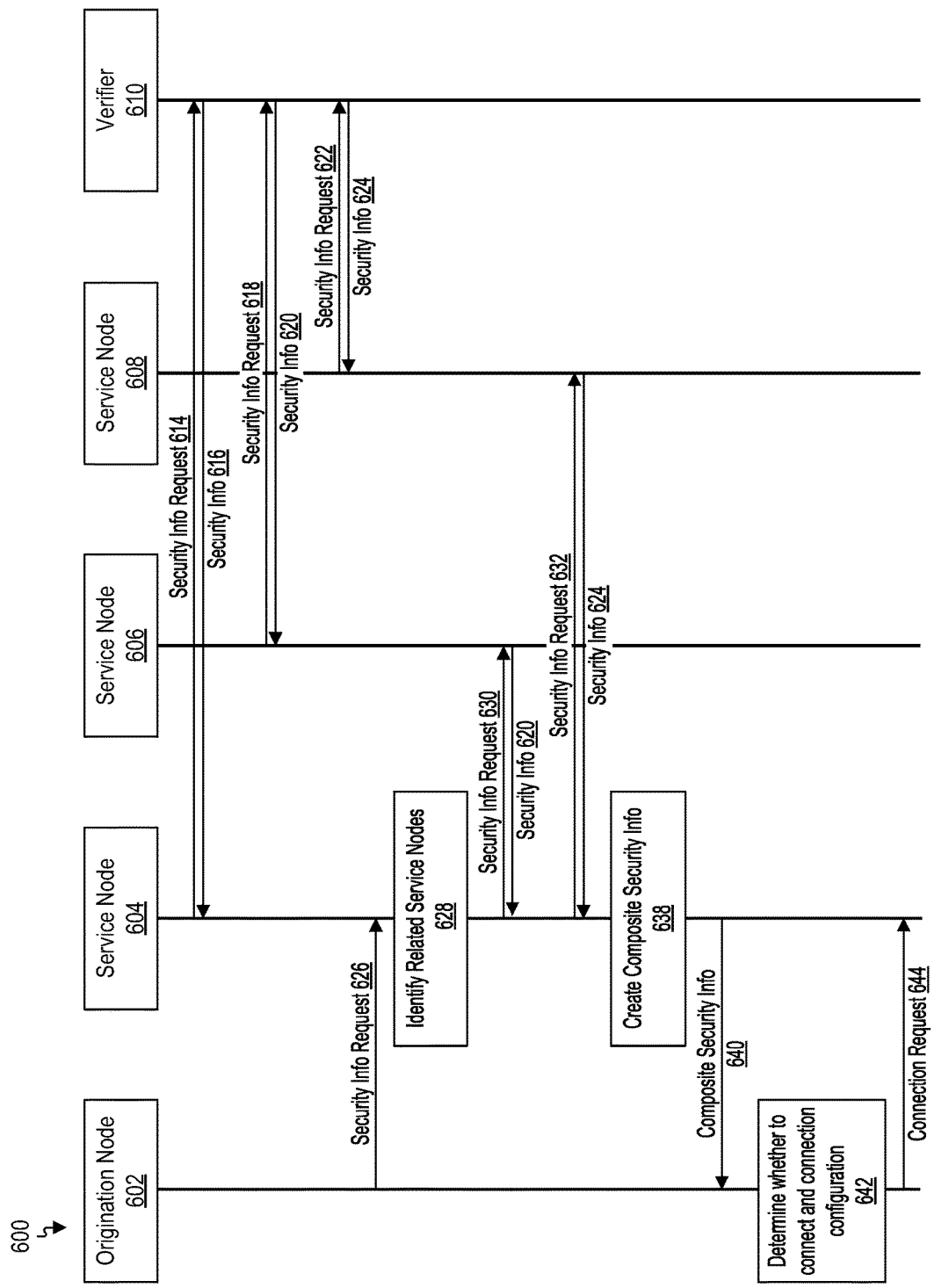
FIG. 6 illustrates a sequence diagram of a process of generating a composite security information for a service in a heterogenous network according to an example of the instant disclosure.

FIG. 6 illustrates a sequence diagram 600 of a process of generating a composite security information for a service in a heterogenous network according to an example of the instant disclosure. In FIG. 6, an origination node 602 is configured to request a trustworthiness vector (e.g., security information) from a service node 604 (e.g., a server, a network device, etc.). In this example, the service node 604 will use service node 606 and service node 608 for data or other operations in the service. Initially, the service node 604, during a booting operation, may transmit a security information request 614 that requests a verifier 610 to provide security information such as a trustworthiness vector, and the security information request 614 may include specific information such as information about the hardware, software, firmware, filesystem, etc. In response, the service node 604 receives the security information 616 such as a trustworthiness vector from the verifier 610, and securely stores the trustworthiness vector in a TEE (e.g., a secure environment such as a TPM, a TAM, or other secure enclave described above).

The service node 606, during a booting operation, may transmit a security information request 618 to the verifier 610 and receive a security information 620 from the verifier 610 for secure storage in a secure environment. The service node 608 also, during a booting operation, may transmit a security information request 622 to the verifier 610 and receive security information 624 from the verifier 610 for secure storage in a secure environment.

The origination node 602 can receive an instruction to, for example, configure a service from a user or a service at the origination node 602, which causes the origination node 602 to transmit a security information request 626 to the service node 604. The security information request 626 can identify the service (e.g., a network service, an application service, etc.) and the service node 604 can determine other service nodes that may provide data, functions, or other content that will be provided to the origination node 602 at block 628. For example, the service node 604 identifies that service node 606 provides data that is needed to be trustworthy, and the service node 608 provides functions that are performed for the service node 604. For example, the service node 608 may perform a secure cryptographic function, an image processing function, or a natural language processing function that would not be suitable to perform at the service node 604.

The identification of related service nodes at block 628 can use different techniques to identify corresponding nodes. For example, the service node 604 can use a hub-and-spoke method whereby each related service node further identifies related service nodes. However, the hub-and-spoke method may create circular loops of service nodes. In some examples, the service node 604 may be part of a group managed by a group membership protocol, and the service node 604 can connect to a management node (not shown) to identify the related service nodes. The various service nodes can also implement a spanning-tree protocol or similar algorithm that prevents the creation of circular loops of service nodes.

After identifying the related service nodes (e.g., the service node 606 and the service node 608), the service node 604 may transmit a security information request 630 to the service node 606 and, in response, receive the security information 620 associated with the service node 606. The service node 604 may also transmit a security information request 632 to the service node 608 and, in response, receive security information 624 associated with the service node 608.

After receiving the security information 620 and the security information 624, at block 638 the service node 604 creates (e.g., generates) composite security information 640 based on the security information of all nodes associated with the service. In this example, the service node 604, the service node 606, and the service node 608 are participating nodes in the service, and the service node 604 generates the composite security information 640 from a combination of the security information 616, the security information 620, and the security information 624. After creating the composite security information 640, the service node 604 sends the composite security information 640 to the origination node 602.

In response to receiving the composite security information 640, the origination node 602 ascertains whether the composite security information is sufficient to support a connection to the service node 604 for the service. For example, if the composite security information 640 indicates that at least one of the service nodes (e.g., service node 604, service node 606, or service node 608) does not have authentic hardware, the service cannot be supported at block 642. In other examples, the origination node 602 may determine to connect with the service node 604 based on a different configuration that, for example, limits secure information or provides a higher level of security that the service node 604 must satisfy. After determining whether the connect and the connection configuration at block 642, the origination node 602 transmits a connection request 644 to the service node 604 to initiate a connection based on the connection configuration (presuming that the origination node 602 allows the connection).

FIGS. 7-10 below describe various examples of generating a composite trustworthiness vector using different TEEs that are integral to the service nodes. The TEEs can provide different security claims that are provided for illustrative purposes only. The implementation of the TEEs can provide the described security claims below or can provide any type of security claim.

Figure 7:
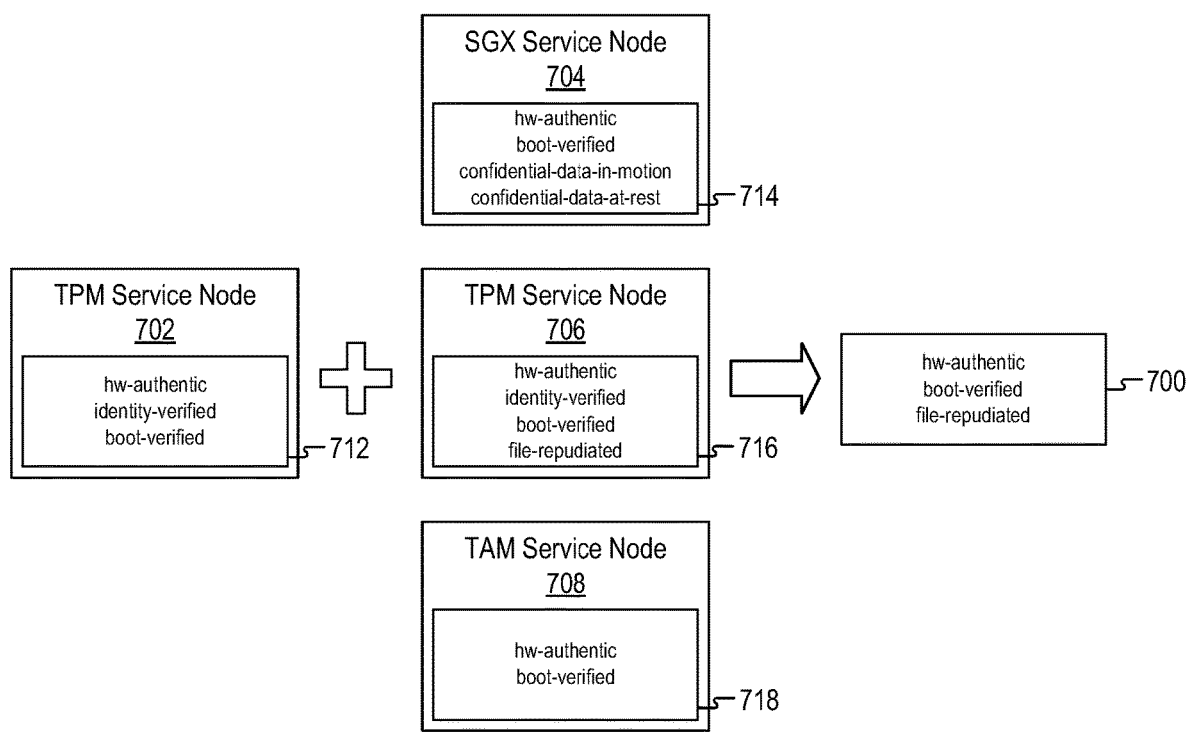
FIGS. 7 through 10 illustrate example diagrams illustrating combination of trustworthiness vectors from service nodes having different trusted execution environments (TEEs) into a composite trustworthiness vector according to an example of the instant disclosure.

FIG. 7 illustrates a diagram illustrating a combination of trustworthiness vectors from service nodes having different TEEs into a composite trustworthiness vector according to an example of the instant disclosure. The composite trustworthiness vector 700 is generated from a TPM service node 702 that includes a TPM module, an SGX service node 704 that includes an SGX enclave, a TPM service node 706 that includes a TPM module, and a TAM service node 708 that includes a TAM module. In this example, the security claims in the trustworthiness vector are Boolean values and are combined using an intersection for affirming claims and a union for detracting claims.

The TPM service node 702 includes a trustworthiness vector 712 with three affirming claims (hw-authentic, identity-verified, boot-verified). The TPM service node 702 is configured to receive a trustworthiness vector 714 from the SGX service node 704, a trustworthiness vector 716 from the TPM service node 706, and a trustworthiness vector 718 from the TAM service node 708 and generate a composite trustworthiness vector 700. In this example, the composite trustworthiness vector 700 includes a hw-authentic security claim and a boot-verified security claim based on the intersection of all trustworthiness vectors including corresponding security claims. The trustworthiness vector 716 of the TPM service node 706 includes a detracting security claim of file-repudiated and will be included in the composite trustworthiness vector 700 based on the union of all detracting security claims.

Figure 8:
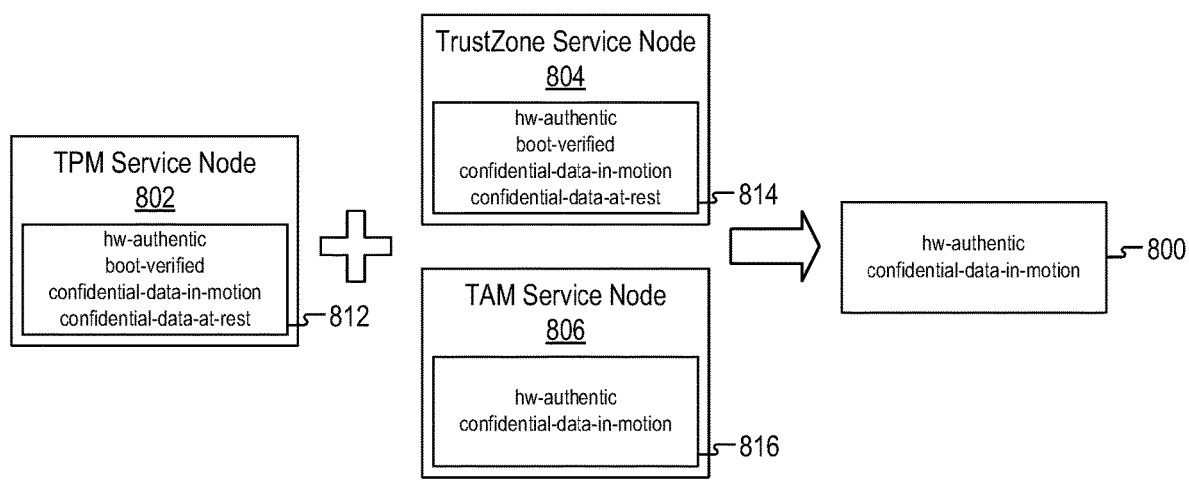

FIG. 8 illustrates another diagram illustrating the combination of trustworthiness vectors from service nodes having different TEEs into a composite trustworthiness vector 800 according to an example of the instant disclosure. The composite trustworthiness vector 800 is generated from a TPM service node 802 that includes a TPM module, a TrustZone service node 804 that includes a TrustZone module, and a TAM service node 806 that includes a TAM module. The combination of the affirming and detracting security claims from the trustworthiness vector 812 of the TPM service node 802, the trustworthiness vector 814 of the TrustZone service node 804, and the trustworthiness vector 816 of the TAM service node 806 yields two affirming security claims in the composite trustworthiness vector 800.

Figure 9:
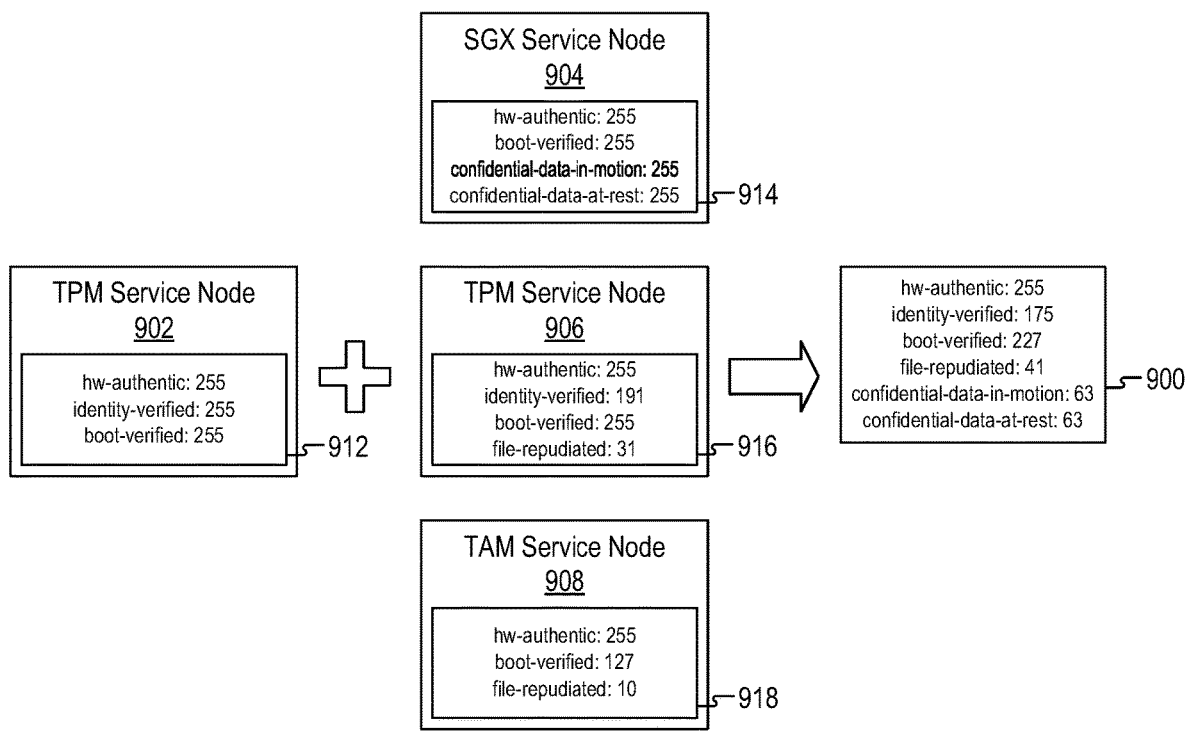

FIG. 9 illustrates a diagram illustrating a combination of trustworthiness vectors with integer values associated with different parameters from service nodes having different TEEs into a composite trustworthiness vector 900 according to an example of the instant disclosure. The composite trustworthiness vector 900 is generated from a TPM service node 902 that includes a TPM module, an SGX service node 904 that includes an SGX, a TPM service node 906 that includes a TPM module, and a TAM service node 908 that includes a TAM module. In this example, the security claims in the trustworthiness vector are integer values and are combined using mathematical (e.g., a median) and logical operations (e.g., a floor or minimum function).

In particular, the trustworthiness vector 912 of the TPM service node 902, the trustworthiness vector 914 of the SGX service node 904, the trustworthiness vector 916 of the TPM service node 906, and the trustworthiness vector 918 of the TAM service node 908 are mathematically and/or logically combined into the composite trustworthiness vector 900 so that each security claim is represented. Affirming claims in this case can be a range from each affirming claim can be calculated using various means such as a sum, a weighted calculated based on the integer value, a non-linear combination, etc. Unlike the logical operations described in FIGS. 8 and 9, the lack of a security claim (e.g., the trustworthiness vector 918 does not include an identify-verified claim) may not affect the calculation for composite trustworthiness vector 900. For example, the trustworthiness vector 918 does not include an identity-verified claim and the composite trustworthiness vector 900 calculates the identity verified claim based on an average. However, in some cases, detracting security claims can be summed as illustrated by the file-repudiated security claim in the composite trustworthiness vector 900 based on the sum of file-repudiated security claims in the trustworthiness vector 916 and the trustworthiness vector 918.

Figure 10:
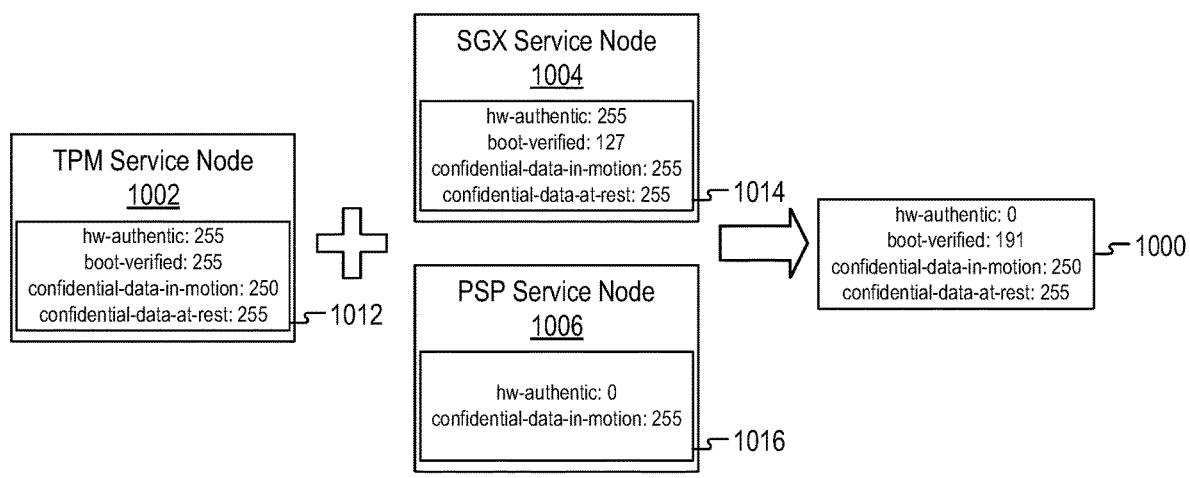

FIG. 10 illustrates a diagram illustrating a combination of trustworthiness vectors with integers associated with different parameters from service nodes having TEEs into a composite trustworthiness vector according to an example of the instant disclosure. The composite trustworthiness vector 1000 is generated from a TPM service node 1002 that includes a TPM module, an SGX service node 1004 that includes an SGX, and a PSP service node 1006 that includes a PSP. In this example, the security claims in the trustworthiness vector are integer values and are combined using mathematical and/or logical operations.

The security claims of the composite trustworthiness vector 1000 is based on various combinations of trustworthiness vector 1012 of the TPM service node 1002, the trustworthiness vector 1014 of the SGX service node 1004, and the trustworthiness vector 1016 of the PSP service node 1006. For example, the hw-authentic security claim in the composite trustworthiness vector 1000 uses a floor (e.g., minimum) function and the boot-verified security claim uses an average of explicit boot-verified claims.

In other examples, the TPM service node 1002 can determine how to combine the security claims based on the data and/or function provided from a corresponding node. For example, the PSP service node 1006 may provide a function based on input data and return that processed data to the TPM service node 1002. In this example, the security claim for confidential-data-in-motion 255 is material and the security claim for confidential-data-at-rest is immaterial for the functions provided by the PSP service node 1006. The TPM service node 1002 determines that the composite trustworthiness vector 1000 includes a security claim for confidential-data-in-motion based on service nodes where the security claim is prescient (e.g., the TPM service node 1002 and the SGX service node 1004) by performing a floor function.

In some cases, different TEEs may have different formats such as a list of corresponding claims (e.g., ["hw-authentic", "file-repudiated"]. In that case, the service node can determine values associated with the explicit claims and determine values with implicit claims. This allows the service node to normalize each type of security information irrespective to type of TEE and format of the security information.

Figure 11:
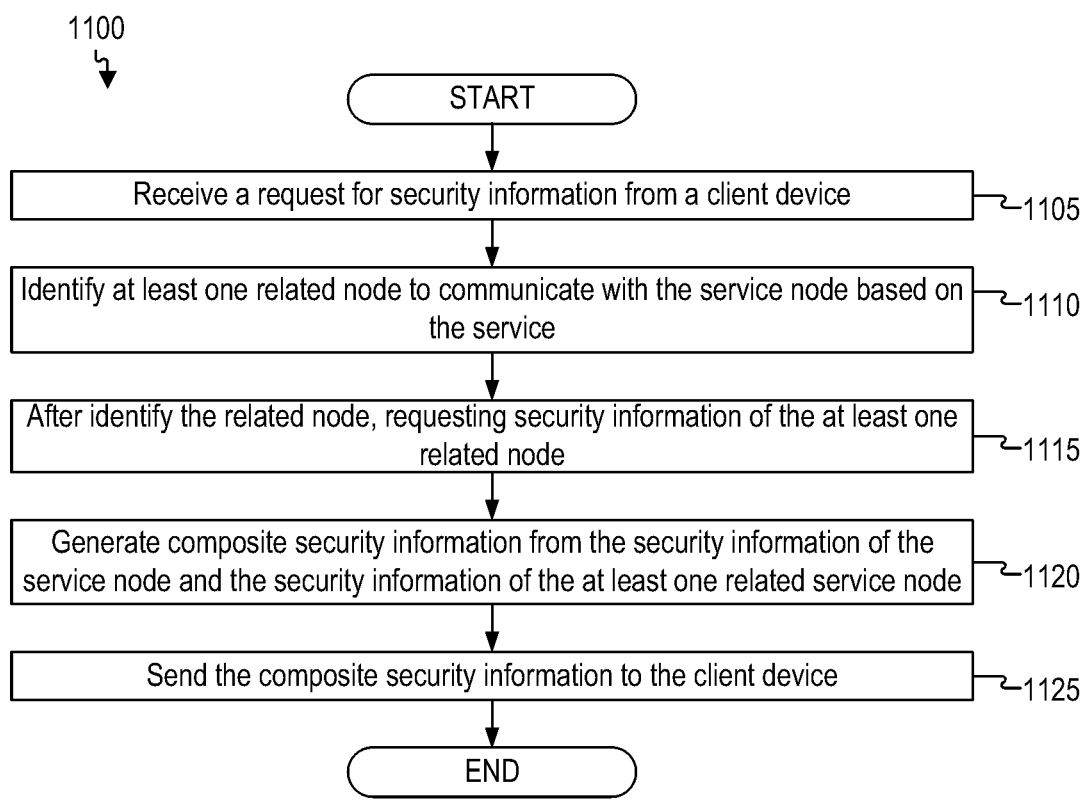
FIG. 11 illustrates an example method of a service node for providing a composite trustworthiness vector in a heterogenous network according to an example of the instant disclosure.

FIG. 11 illustrates an example method 1100 for generating a composite trustworthiness vector in a heterogeneous network according to an example of the instant disclosure. Although the example method 1100 depicts a particular sequence of operations, the sequence may be altered without departing from the scope of the present disclosure. For example, some of the operations depicted may be performed in parallel or in a different sequence that does not materially affect the function of the method 1100. In other examples, different components of an example device or system that implements the method 1100 may perform functions at substantially the same time or in a specific sequence.

According to some examples, the method includes receiving a request for security information of the service node from a client device at block 1105. For example, the processor 1410 may receive a request for security information of the service node from a client device. In some examples, the request includes information identifying a service to receive from the service node (e.g., an application programming interface (API), a gRPC service, etc.).

A verifier device determines the security information of the service node and the security information of related service nodes. The security information includes a plurality of claims related to a type of verification, which can include affirming or detracting values (e.g., Boolean values, integer values, etc.). In some examples, the type of verification includes at least one a hardware verification, a unique identify verification, a data integrity verification, a boot verification, and an executable verification. Additional types of verification can be included in the security information. The security information is based on hardware protected information that is isolated and unavailable to an operating system or application. For example, a vendor's public key is hashed and is verified by the TEE, and then the public key can be used to verify a digital signature of a trusted firmware from the vendor. The trusted firmware can be configured to provide security information such as boot verification, executable verification, etc.

After receiving the request for the security information, the method 1100 includes identifying (e.g., by the processor 1410) at least one related node to communicate with the service node based on the service at block 1110.

In a first example, identifying the related node at block 1110 may include transmitting a request to a management node to identify candidate related nodes. The management node executes a group membership protocol to create different groups associated with each service and responds to the request with a list of candidate related nodes associated with the service. The service node may elect to receive security information from some or all of the candidate related nodes identified by the management node.

In a second example, identifying the related node at block 1110 may include executing a spanning tree algorithm to identify candidate nodes associated with the service from addressable nodes. The spanning tree algorithm can cause a node to, for example, provide a security information advertisement to neighbor nodes, receive security information advertisements from the neighbor nodes in response to the security information advertisement, identify a looped route associated with a neighbor node based on a plurality of potential paths to the neighbor node from the neighboring security information advertisements, and exclude the neighbor node as a candidate child node.

After identifying the related node, the method 1100 includes requesting (e.g., by the processor 1410) security information (e.g., a trustworthiness vector) of the related node (or nodes) at block 1115. In response to the request for the security information, the service node may receive security information from each related node.

After receiving security information from the related node (or nodes), the method 1100 includes generating (e.g., by the processor 1410) composite security information from the security information of the service node and the security information of the at least one related service node at block 1120. For example, the processor 1410 illustrated in FIG. 14 may generate composite security information from the security information of the service node and the security information of the child node. In some examples, generating of the composite security information may include combining (e.g., by the processor 1410) each corresponding claim in the security information of the service node and the security information of the child node to yield the composite security information. Examples of combining corresponding claims in the security information are further described in FIGS. 12 and 13.

According to some examples, the method includes sending the composite security information to the client device at block 1125. For example, the processor 1410 illustrated in FIG. 14 may send the composite security information to the client device. The client device receives the composite security information and determines to allow connectivity or implement a policy based on the composite security information.

Figure 12:
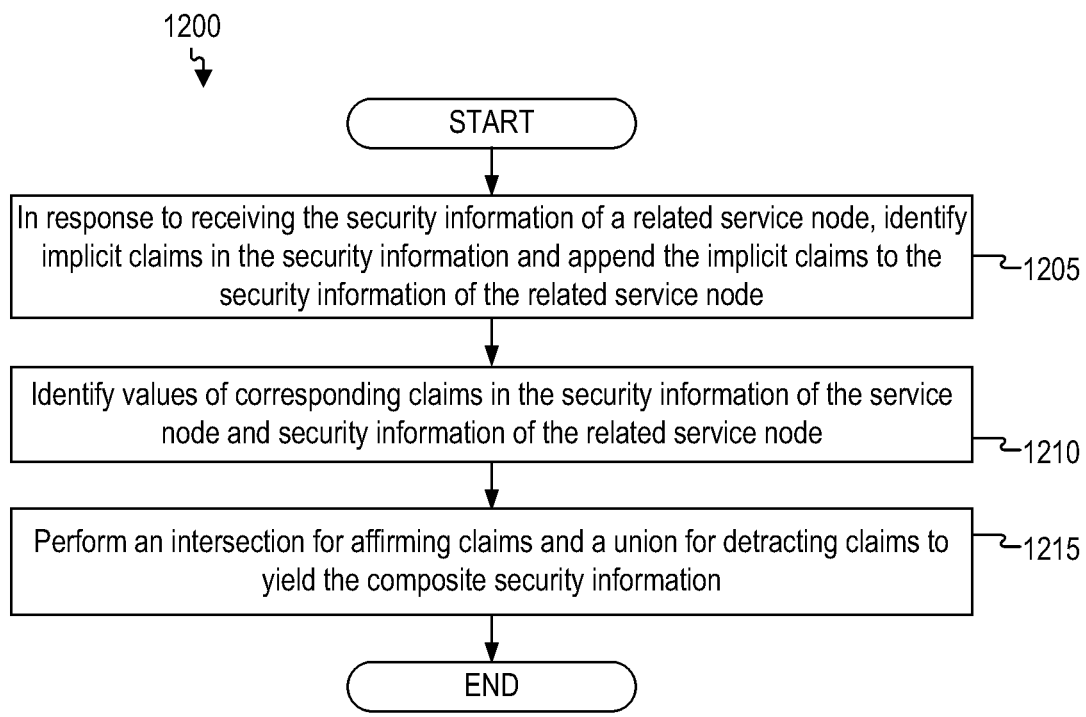
FIG. 12 illustrates an example method for combining security information of various related service nodes into a composite security information according to an example of the instant disclosure.

FIG. 12 illustrates an example method 1200 for combining security information of various related service nodes into composite security information according to an example of the instant disclosure. For example, the method 1200 can be performed by a service node that has received security information from a related service node. Initially, the method 1200 comprises, in response to receiving the security information from the child node, identifying (e.g., by the processor 1410) implicit claims in the security information of the child node and appending the implicit claims to the security information from the child node at block 1205. At block 1210, the service node may identify values of corresponding claims in the security information of the service node and security information of the related service node. For example, the service node may identify a first value associated with a specific claim in the security information of the service node and a second value associated with that same specific claim in the security information of the child node.

At block 1215, the method 1200 can include performing (e.g., by the processor 1410) an intersection for affirming claims and a union for detracting claims to yield the composite security information. For example, the service node may generate a composite value for the specific claim in the composite security information based on the first value and the second value. Affirming claims that are not present in each security information may be excluded from the composite security information and detracting claims that are present in any security information may be included in the composite security information. In some examples, the composite security information may correspond to the security information illustrated in Table 4 above. In this example, the security information includes explicit affirming and detracting claims.

Figure 13:
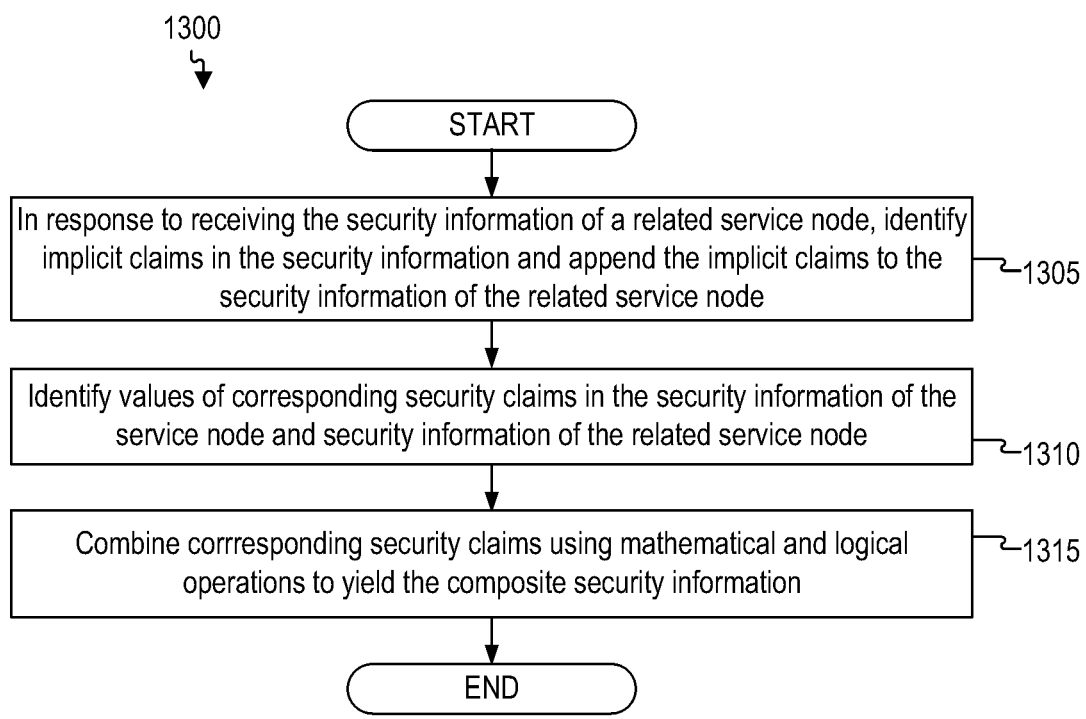
FIG. 13 illustrates an example method for combining security information of various related service nodes into a composite security information according to an example of the instant disclosure.
Figure 14:
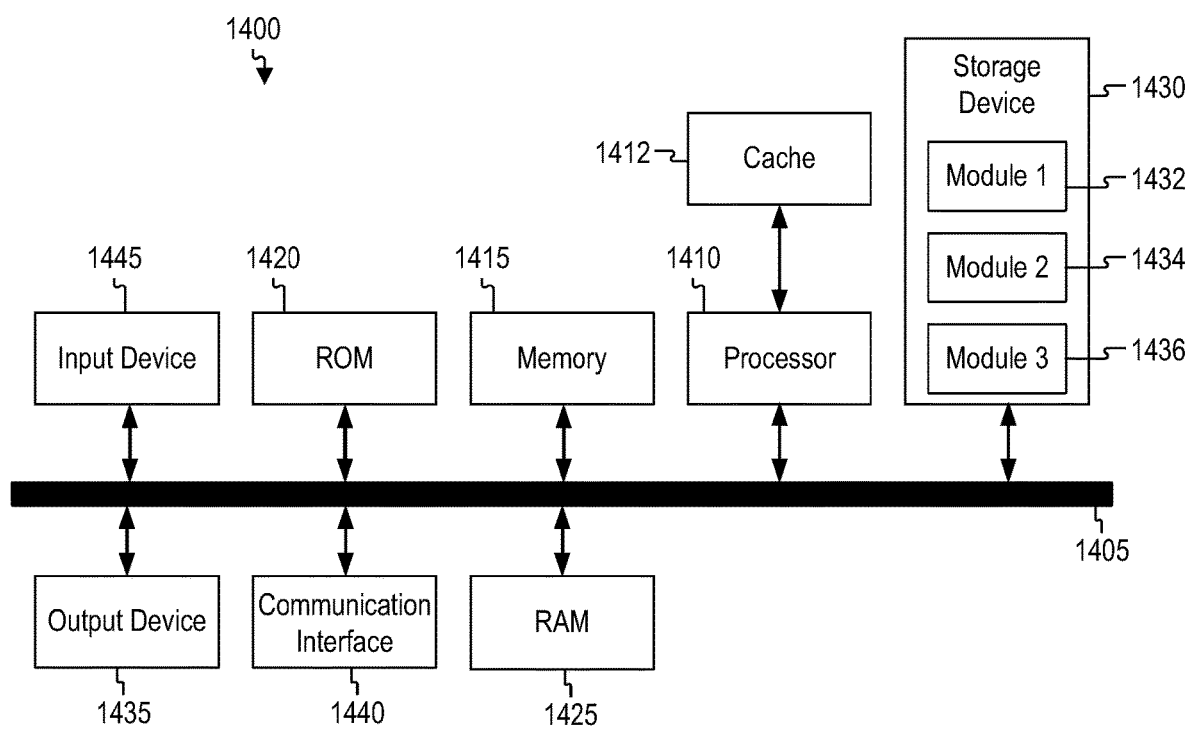
FIG. 14 illustrates an example of a computing system according to an example of the instant disclosure.

FIG. 13 illustrates an example method 1300 for combining security information of various related service nodes into composite security information according to an example of the instant disclosure. For example, the method 1300 can be performed by a service node that previously received security information from a related service node. Initially, the method 1200 comprises, in response to receiving the security information from the child node, identifying (e.g., by the processor 1410) implicit claims in the security information of the child node and appending the implicit claims to the security information from the child node at block 1305.

At block 1310, the method 1300 includes identifying (e.g., by the processor 1410) values of corresponding security claims in the security information of the service node and security information of the related service node. In this case, the claims can include integer values that determine whether the security claim is either detracting or affirming (or neutral). At block 1315, the method 1300 includes combining (e.g., by the processor 1410) corresponding security claims using mathematical and logical operations to yield the composite security information. As noted above, the values can be averaged, non-linearly combined, combined based on weights, statistically combined using various statistical methods, a minimum can be identified, a maximum can be identified, etc. In some examples, the composite security information may correspond to the security information illustrated in Table 5 above. In this example, each security claim includes a range and can correspond to explicit affirming claims, neutral claims, and detracting claims. A neutral could be, for example, an inferred security claim that is not explicitly provided by the TEE.

FIG. 14 shows an example of computing system 1400, which can be for example any computing device making up any network node such as the origination node 602, service node 604, service node 606, service node 608, verifier 610, management node (not shown) or any component thereof in which the components of the system are in communication with each other using connection 1405. Connection 1405 can be a physical connection via a bus, or a direct connection into processor 1410, such as in a chipset architecture. Connection 1405 can also be a virtual connection, networked connection, or logical connection.

In some embodiments computing system 1400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 1400 includes at least one processing unit (CPU or processor) 1410 and connection 1405 that couples various system components including system memory 1415, such as ROM 1420 and RAM 1425 to processor 1410. Computing system 1400 can include a cache of high-speed memory 1412 connected directly with, in close proximity to, or integrated as part of processor 1410.

Processor 1410 can include any general-purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms known to those of skill in the art. In some instances, multimodal systems can enable a user to provide multiple types of input/output to communicate with computing system 1400. Computing system 1400 can include communications interface 1440, which can generally govern and manage the user input and system output. There is no restriction on operating on any particular hardware arrangement and therefore the basic features here may easily be substituted for improved hardware or firmware arrangements as they are developed.

Storage device 1430 can be a non-volatile memory device and can be a hard disk or other types of computer readable media which can store data that are accessible by a computer, such as magnetic cassettes, flash memory cards, solid state memory devices, digital versatile disks, cartridges, RAMs, ROMs, and/or some combination of these devices.

The storage device 1430 can include software services, servers, services, etc., that, when the code that defines such software is executed by the processor 1410, causes the system to perform a function. In some embodiments, a hardware service that performs a particular function can include the software component stored in a computer-readable medium in connection with the necessary hardware components, such as processor 1410, connection 1405, output device 1435, etc., to carry out the function.

Figure 15:
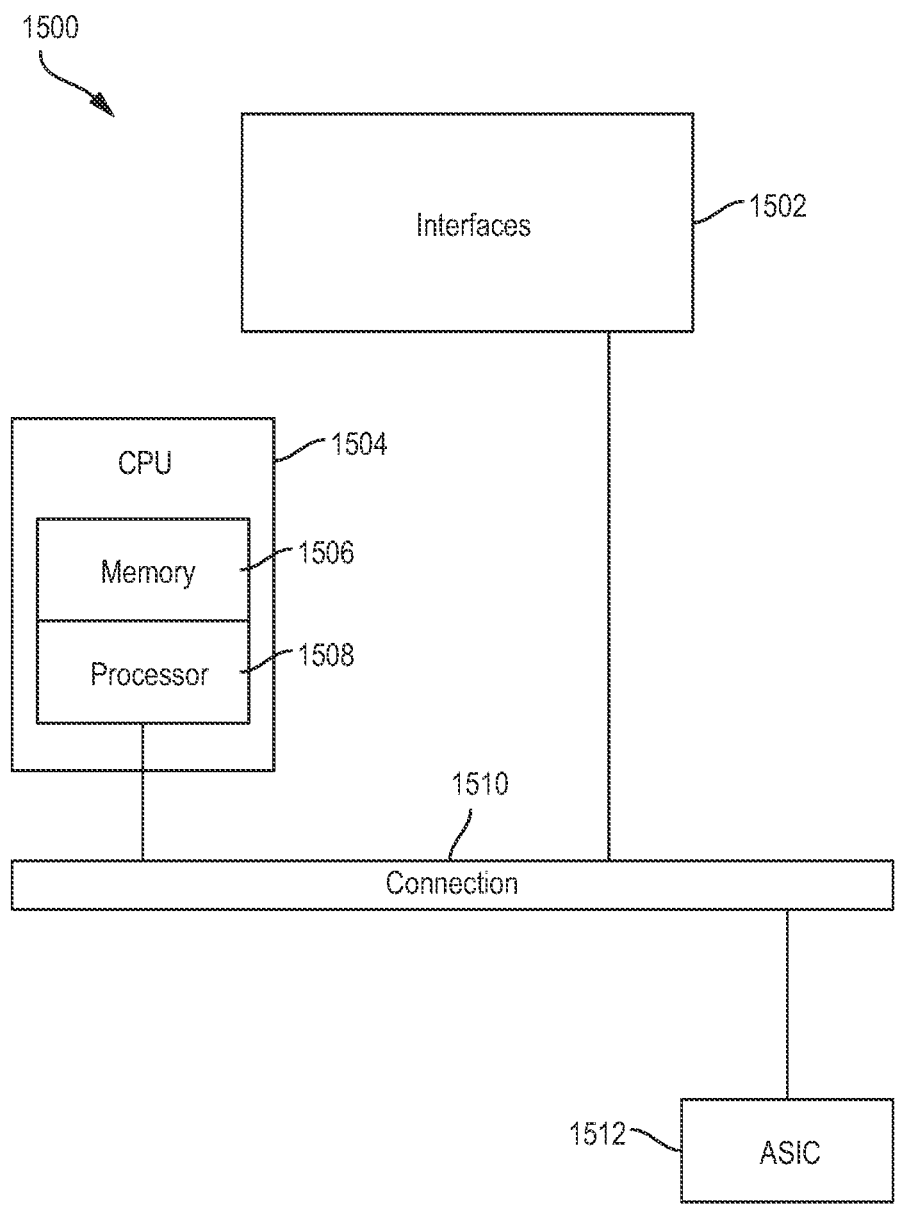
FIG. 15 illustrates an example network device in accordance with some examples of the disclosure.

FIG. 15 illustrates an example network device 1500 suitable for performing switching, routing, load balancing, and other networking operations. The example network device 1500 can be implemented as switches, routers, nodes, metadata servers, load balancers, client devices, and so forth.

Network device 1500 includes a central processing unit (CPU) 1504, interfaces 1502, and a bus 1510 (e.g., a peripheral component interconnect (PCI) bus). When acting under the control of appropriate software or firmware, the CPU 1504 is responsible for executing packet management, error detection, and/or routing functions. The CPU 1504 preferably accomplishes all these functions under the control of software including an operating system and any appropriate applications software. CPU 1504 may include one or more processors 1508, such as a processor from the INTEL X86 family of microprocessors. In some cases, processor 1508 can be specially designed hardware for controlling the operations of network device 1500. In some cases, a memory 1506 (e.g., non-volatile RAM, ROM, etc.) also forms part of CPU 1504. However, there are many different ways in which memory could be coupled to the system.

The interfaces 1502 are typically provided as modular interface cards (sometimes referred to as "line cards"). Generally, they control the sending and receiving of data packets over the network and sometimes support other peripherals used with the network device 1500. Among the interfaces that may be provided are Ethernet interfaces, frame relay interfaces, cable interfaces, digital subscriber line (DSL) interfaces, token ring interfaces, and the like. In addition, various very high-speed interfaces may be provided such as fast token ring interfaces, wireless interfaces, Ethernet interfaces, Gigabit Ethernet interfaces, asynchronous transfer mode (ATM) interfaces, high-speed serial interfaces (HSSI), point-of-sale (POS) interfaces, fiber distributed data interface (FDDI), WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 1504) to efficiently perform routing computations, network diagnostics, security functions, etc.

Although the system shown in FIG. 15 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 1500.

Regardless of the network device's configuration, it may employ one or more memories or memory modules (including memory 1506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1506 could also hold various software containers and virtualized execution environments and data.

The network device 1500 can also include an application specific integrated circuit (ASIC) 1512, which can be configured to perform routing and/or switching operations. The ASIC 1512 can communicate with other components in the network device 1500 via the bus 1510, to exchange data and signals and coordinate various types of operations by the network device 1500, such as routing, switching, and/or data storage operations, for example.

In some examples, the disclosed system can verify the identity and security posture of a platform before you interact with it. For example, Azure Attestation receives evidence from the platform, validates it with security standards, evaluates it against configurable policies, and produces an attestation token for claims-based applications. The service supports attestation of TPMs and TEEs like Intel® SGX and virtualization-based security (VBS) enclaves Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method for verifying trust by a service node, the method comprising: receiving a request for a security information of the service node from a client device, wherein the request includes information identifying a service to receive from the service node; identifying a related node to communicate with the service node based on the service; after identifying the related node, requesting a security information of the related node; generating a composite security information from the security information of the service node and the security information of the related node; and sending the composite security information to the client device.

Aspect 2. The method of Aspect 1, wherein the security information includes a plurality of claims related to a type of verification, wherein the type of verification includes at least one a hardware verification, a unique identify verification, a data integrity verification, a boot verification, and an executable verification.

Aspect 3. The method of any of Aspects 1 to 2, first comprising: in response to receiving the security information from the related node, identifying implicit claims in the security information of the related node, and appending the implicit claims to the security information from the related node.

Aspect 4. The method of any of Aspects 1 to 3, wherein generating of the composite security information comprises: combining each corresponding claim in the security information of the service node and the security information of the related node to yield the composite security information.

Aspect 5. The method of any of Aspects 1 to 4, wherein the combining each corresponding claim comprises: identifying a first value associated with a first claim in the security information of the service node and a second value associated with the first claim in the security information of the related node; and generating a composite value for the first claim in the composite security information based on the first value and the second value.

Aspect 6. The method of any of Aspects 1 to 5, wherein the combining each type of verification comprises: identifying a detracting value associated with a first claim in one of the security information of the related node and the security information of the service node; and excluding the first claim from the composite security information.

Aspect 7. The method of any of Aspects 1 to 6, wherein the combining each type of verification comprises: normalizing security claims in the security information of the related node and the security information of the service node; and combining each security claim into the composite security information.

Aspect 8. The method of any of Aspects 1 to 7, further comprising: executing a spanning tree algorithm to identify candidate nodes associated with the service from addressable nodes, wherein the related node is selected from the candidate nodes.

Aspect 9. The method of any of Aspects 1 to 8, wherein the service node comprises a first trusted module and the related node comprises a second trusted module, and wherein the first trusted module is different from the second trusted module.

Aspect 10. The method of any of Aspects 1 to 9, further comprising: transmitting a request to a management node to identify candidate related nodes; and receiving a list of the candidate related nodes, wherein the management node executes a group membership protocol to create different groups associated with each service.

Aspect 11: A service for providing a composite security information includes a storage (implemented in circuitry) configured to store instructions and a processor. The processor configured to execute the instructions and cause the processor to: receive a request for a security information of the service node from a client device, wherein the request includes information identifying a service to receive from the service node; identify a related node to communicate with the service node based on the service; after identifying the related node, request a security information of the related node; generate a composite security information from the security information of the service node and the security information of the related node; and send the composite security information to the client device.

Aspect 12: The service of Aspect 11, wherein the security information includes a plurality of claims related to a type of verification, wherein the type of verification includes at least one a hardware verification, a unique identify verification, a data integrity verification, a boot verification, and an executable verification.

Aspect 13: The service of any of Aspects 11 to 12, wherein the processor is configured to execute the instructions and cause the processor to: identify implicit claims in the security information of the related node, and append the implicit claims to the security information from the related node.

Aspect 14: The service of any of Aspects 11 to 13, wherein the processor is configured to execute the instructions and cause the processor to: combine each corresponding claim in the security information of the service node and the security information of the related node to yield the composite security information.

Aspect 15: The service of any of Aspects 11 to 14, wherein the processor is configured to execute the instructions and cause the processor to: identify a first value associated with a first claim in the security information of the service node and a second value associated with the first claim in the security information of the related node; and generate a composite value for the first claim in the composite security information based on the first value and the second value.

Aspect 16: The service of any of Aspects 11 to 15, wherein the processor is configured to execute the instructions and cause the processor to: identify a detracting value associated with a first claim in one of the security information of the related node and the security information of the service node; and excluding the first claim from the composite security information.

Aspect 17: The service of any of Aspects 11 to 16, wherein normalizing security claims in the security information of the related node and the security information of the service node; and combine each security claim into the composite security information.

Aspect 18: The service of any of Aspects 11 to 17, wherein executing a spanning tree algorithm to identify candidate nodes associated with the service from addressable nodes, wherein the related node is selected from the candidate nodes.

Aspect 19: The service of any of Aspects 11 to 18, wherein the service node comprises a first trusted module and the related node comprises a second trusted module, and wherein the first trusted module is different from the second trusted module.

Aspect 20: The service of any of Aspects 11 to 19, wherein the processor is configured to execute the instructions and cause the processor to: transmit a request to a management node to identify candidate related nodes; and receive a list of the candidate related nodes, wherein the management node executes a group membership protocol to create different groups associated with each service.

Aspect 21: A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: receive a request for a security information of the service node from a client device, wherein the request includes information identifying a service to receive from the service node; identify a related node to communicate with the service node based on the service; after identifying the related node, request a security information of the related node; generate a composite security information from the security information of the service node and the security information of the related node; and send the composite security information to the client device.

Aspect 22: The computer readable medium of Aspect 21, wherein the security information includes a plurality of claims related to a type of verification, wherein the type of verification includes at least one a hardware verification, a unique identify verification, a data integrity verification, a boot verification, and an executable verification.

Aspect 23: The computer readable medium of any of Aspects 21 to 22, wherein the processor is configured to execute the computer readable medium and cause the processor to: identify implicit claims in the security information of the related node, and append the implicit claims to the security information from the related node.

Aspect 24: The computer readable medium of any of Aspects 21 to 23, wherein the processor is configured to execute the computer readable medium and cause the processor to: combine each corresponding claim in the security information of the service node and the security information of the related node to yield the composite security information.

Aspect 25: The computer readable medium of any of Aspects 21 to 24, wherein the processor is configured to execute the computer readable medium and cause the processor to: identify a first value associated with a first claim in the security information of the service node and a second value associated with the first claim in the security information of the related node; and generate a composite value for the first claim in the composite security information based on the first value and the second value.

Aspect 26: The computer readable medium of any of Aspects 21 to 25, wherein the processor is configured to execute the computer readable medium and cause the processor to: identify a detracting value associated with a first claim in one of the security information of the related node and the security information of the service node; and excluding the first claim from the composite security information.

Aspect 27: The computer readable medium of any of Aspects 21 to 26, wherein normalizing security claims in the security information of the related node and the security information of the service node; and combine each security claim into the composite security information.

Aspect 28: The computer readable medium of any of Aspects 21 to 27, wherein executing a spanning tree algorithm to identify candidate nodes associated with the service from addressable nodes, wherein the related node is selected from the candidate nodes.

Aspect 29: The computer readable medium of any of Aspects 21 to 28, wherein the service node comprises a first trusted module and the related node comprises a second trusted module, and wherein the first trusted module is different from the second trusted module.

Aspect 30: The computer readable medium of any of Aspects 21 to 29, wherein the processor is configured to execute the computer readable medium and cause the processor to: transmit a request to a management node to identify candidate related nodes; and receive a list of the candidate related nodes, wherein the management node executes a group membership protocol to create different groups associated with each service.

What is claimed is:

1. A method for verifying trust by a service node, the method comprising:
   receiving a request for a security information of the service node from a client device, wherein the request includes information identifying a service to receive from the service node;
   identifying a related service node to communicate with the service node based on the service, wherein the related service node is associated with the service;
   after identifying the related service node, requesting a security information of the related service node;
   generating a composite security information from the security information of the service node and the security information of the related service node, including:
      identifying affirming claims and detracting claims in the security information of the service node and the security information of the related service node, the affirming claims being in support of providing security, and the detracting claims being opposed to provide security;
      including in the composite security information matching affirming claims which appear in both the security information of the service node and the security information of the related service node;
      excluding from the composite security information affirming claims which appear in one but not both of the security information of the service node and the security information of the related service node;
      including in the composite security information any detracting claims that appear in either of the security information of the service node and the security information of the related service node; and sending the composite security information to the client device.

2. The method of claim 1, wherein the security information includes a plurality of claims related to a type of verification, wherein the type of verification includes at least one a hardware verification, a unique identify verification, a data integrity verification, a boot verification, and an executable verification.

3. The method of claim 2, first comprising: in response to receiving the security information from the related service node, identifying implicit claims in the security information of the related service node, and appending the implicit claims to the security information from the related service node.

4. The method of claim 1, further comprising:
executing a spanning tree algorithm to identify candidate nodes associated with the service from addressable nodes, wherein the related service node is selected from the candidate nodes.

5. The method of claim 1, wherein the service node comprises a first trusted module and the related service node comprises a second trusted module, and wherein the first trusted module is different from the second trusted module.

6. The method of claim 1, further comprising:
transmitting a request to a management node to identify candidate related service nodes; and
receiving a list of the candidate related service nodes from a management node that determines which candidate nodes are qualified to deliver the service.

7. A service node for providing trust postures of a heterogenous system, comprising:
a memory configured to store instructions; and
a processor configured to execute the instructions and cause the processor to:
receive a request for a security information of the service node from a client device, wherein the request includes information identifying a service to receive from the service node;
identify a related service node to communicate with the service node based on the service, wherein the related service node is associated with the service;
after identifying the related service node, request a security information of the related service node;
generate a composite security information from the security information of the service node and the security information of the related service node, including:
identify affirming claims and detracting claims in the security information of the service node and the security information of the related service node, the affirming claims being in support of providing security, and the detracting claims being opposed to provide security;
include in the composite security information matching affirming claims which appear in both the security information of the service node and the security information of the related service node;
exclude from the composite security information affirming claims which appear in one but not both of the security information of the service node and the security information of the related service node;
include in the composite security information any detracting claims that appear in either of the security information of the service node and the security information of the related service node; and
send the composite security information to the client device.

8. The service node of claim 7, wherein the security information includes a plurality of claims related to a type of verification, wherein the type of verification includes at least one a hardware verification, a unique identify verification, a data integrity verification, a boot verification, and an executable verification.

9. The service node of claim 7, wherein the processor is configured to execute the instructions and cause the processor to:
executing a spanning tree algorithm to identify candidate nodes associated with the service from addressable nodes, wherein the related service node is selected from the candidate nodes.

10. The service node of claim 7, wherein the service node comprises a first trusted module and the related service node comprises a second trusted module, and wherein the first trusted module is different from the second trusted module.

11. A non-transitory computer readable medium comprising instructions, the instructions, when executed by a computing system, cause the computing system to:
receive a request for a security information of a service node from a client device, wherein the request includes information identifying a service to receive from the service node;
identify a related service node to communicate with the service node based on the service, wherein the related service node is associated with the service;
after identifying the related service node, request a security information of the related service node;
generate a composite security information from the security information of the service node and the security information of the related service node, including:
identify affirming claims and detracting claims in the security information of the service node and the security information of the related service node, the affirming claims being in support of providing security, and the detracting claims being opposed to provide security;
include in the composite security information matching affirming claims which appear in both the security information of the service node and the security information of the related service node;
exclude from the composite security information affirming claims which appear in one but not both of the security information of the service node and the security information of the related service node;
include in the composite security information any detracting claims that appear in either of the security information of the service node and the security information of the related service node; and
send the composite security information to the client device.

* * * * *